(12) United States Patent
Reed

(10) Patent No.: US 7,861,179 B2
(45) Date of Patent: *Dec. 28, 2010

(54) SELECTION INTERFACE SYSTEM

(76) Inventor: George William Reed, 639 Vicente Ave., Berkeley, CA (US) 94710

( * ) Notice: Subject to any disclaimer, the term of this patent is extended or adjusted under 35 U.S.C. 154(b) by 601 days.

This patent is subject to a terminal disclaimer.

(21) Appl. No.: 11/833,690

(22) Filed: Aug. 3, 2007

(65) Prior Publication Data

US 2008/0040671 A1 Feb. 14, 2008

Related U.S. Application Data

(63) Continuation of application No. 10/444,329, filed on May 22, 2003, now Pat. No. 7,254,785, which is a continuation-in-part of application No. 10/357,803, filed on Feb. 3, 2003, now Pat. No. 7,207,013, which is a continuation of application No. 09/507,474, filed on Feb. 17, 2000, now Pat. No. 6,552,739.

(51) Int. Cl.
G06F 3/048 (2006.01)

(52) U.S. Cl. .................................. 715/763; 715/841

(58) Field of Classification Search .............. 715/763, 715/840, 841, 850, 851, 853
See application file for complete search history.

(56) References Cited

U.S. PATENT DOCUMENTS

| | | | |
|---|---|---|---|
| 6,031,471 A | 2/2000 | Wilson | |
| 6,249,772 B1 | 6/2001 | Walker et al. | |
| 6,304,855 B1 * | 10/2001 | Burke | 705/27 |
| 6,414,693 B1 * | 7/2002 | Berger et al. | 345/641 |
| 6,552,739 B1 | 4/2003 | Reed | |
| 7,080,070 B1 | 7/2006 | Gavarini | |
| 7,107,226 B1 | 9/2006 | Cassidy et al. | |
| 7,207,013 B2 | 4/2007 | Reed | |
| 7,533,041 B2 | 5/2009 | Reed | |
| 2001/0013014 A1 * | 8/2001 | Fukumuro | 705/26 |
| 2002/0128151 A1 | 9/2002 | Galligan et al. | |
| 2003/0095096 A1 * | 5/2003 | Robbin et al. | 345/156 |

OTHER PUBLICATIONS

Batdorff, L.; "Companies Turn to Internet to Cut Catalogs' Weight"; May 19, 1997, Technology, p. 17.
Anon., "HP Products Now Available at U.S. Navy's ITEC Mall", PR Newswire, Aug. 12, 1998.

* cited by examiner

*Primary Examiner*—Weilun Lo
*Assistant Examiner*—Truc T Chuong
(74) *Attorney, Agent, or Firm*—Michael A. Glenn; Glenn Patent Group

(57) ABSTRACT

A user selection interface system comprises one or more circular selectors linked to selectable characteristics, and a display linked to the selectors, for display of an image which corresponds to the selected characteristics. The interface is typically linked to a database comprising stored image and other information which corresponds to the selectable characteristics, whereby an image that corresponds to an item which meets a selected characteristic is retrieved and displayed. Information other than the image which corresponds to the selectable characteristics may also be retrieved and displayed. In some embodiments, the stored images comprise a single image, which matches all the selected characteristics. In alternate embodiments, the displayed image comprises a composite image that is based upon stored images which correspond to different selected characteristics. In some embodiments, the user selection interface comprises a graphic user interface. In alternate embodiments, the user selection interface comprises a mechanical interface. Some preferred embodiments of the user selection interface provide links for merchandising functions, such as for ordering, purchasing, inventories, and/or shipping.

10 Claims, 19 Drawing Sheets

| NEW | FOLDER NAME | 002X002D041.HTML | 1602 1604 |

| PAGE IDENTITY | .../002X002D041.html | DONT FILL THIS IN |

| CATEGORY | HOT DIPPED GALVANIZED WIRE MESH |
| DESCRIPTION | 2 MESH .041 Wire Diameter |
| PART NUMBER ○ | 002X002D041 |
| PRIMARY PHOTO I.D. NUMBER MVC | 253 |
| RULER SIZE | 3" x 2" |
| holes shown left to right | 6 |
| holes shown top to bottom | 4 |
| ABOVE PHOTO COMMENT | |
| ABOVE PHOTO COMMENT LINK | |
| comment done | no |

| 004X004G035 | 252 |
LINK TOO NEXT FINER WEAVE
IN THIS CATEGORY

LINK TO NEXT
HEAVIER WIRE DIAMETER
IN THIS CATEGORY
| 002X002D063 |
| 264 |

LINK TO NEXT
LIGHTER WIRE DIAMETER
IN THIS CATEGORY
| NO LINK |
| NONE |

| NO LINK |
LINK TO NEXT COARSER WEAVE    | NONE |
IN THIS CATEGORY
COMMENTS

Pictured above is extra heavy commercial grade 2 mesh, 19 gauge, hot-dipped galvanized woven hardware cloth. TWP can also slit and cut this material to size. Further characteristics of this zinc-coated steel mesh is provided on an information page. This mesh is also available in a superior galvanized grade. Similar mesh is available in S/S Welded.

price table comments | Prices are in U.S. dollars per roll. Rolls are 100 feet in length. Inquire about larger quantity pricing. Various warehouses and excellent freight programs are available.

| ALTERNATIVE VIEW #1 | NO LINK AVAILABLE YET |
| ALTERNATIVE VIEW #2 | NO LINK AVAILABLE YET |
| DATA EXCEL SPREAD SHEET NAME | 002X002D041DATA |
| PRICING EXCEL SPREAD SHEET NAME | 002X002D041PRICES |
| DISK EXCEL SPREAD SHEET NAME | 002X002D041discs |

| NEW | FOLDER NAME | 004X004D025.HTML | 1702 1704 |

| PAGE IDENTITY | .../004X004D025.html | DONT FILL THIS IN |

| | |
|---:|:---|
| CATEGORY | HOT DIPPED GALVANIZED WIRE MESH |
| DESCRIPTION | 4 MESH .025 Wire Diameter |
| PART NUMBER ○ | 004X004D025 |
| PRIMARY PHOTO I.D. NUMBER MVC | 251 |
| RULER SIZE | 3" x 2" |
| holes shown left to right | 12 |
| holes shown top to bottom | 8 |
| ABOVE PHOTO COMMENT | |
| ABOVE PHOTO COMMENT LINK | |
| comment done | no |

008X008G017        248
LINK TO NEXT FINER WEAVE
IN THIS CATEGORY

LINK TO NEXT HEAVIER WIRE DIAMETER IN THIS CATEGORY
004X004G035
252

LINK TO NEXT LIGHTER WIRE DIAMETER IN THIS CATEGORY
NO LINK
NONE

002X002D041        253
LINK TO NEXT COARSER WEAVE
IN THIS CATEGORY

COMMENTS

Pictured above is extra heavy commercial grade 4 mesh, 23 gauge, hot-dipped galvanized woven hardware cloth. TWP can also slit and cut this material to size. Further characteristics of this zinc-coated steel mesh is provided on an information page. This mesh is also available in a superior galvanized grade. Similar mesh is available in S/S Welded.

| price table comments | Prices are in U.S. dollars per roll. Rolls are 100 feet in length. Inquire about larger quantity pricing. Various warehouses and excellent freight programs are available. |

| | |
|---:|:---|
| ALTERNATIVE VIEW #1 | NO LINK AVAILABLE YET |
| ALTERNATIVE VIEW #2 | NO LINK AVAILABLE YET |
| DATA EXCEL SPREAD SHEET NAME | 004X004D025DATA |
| PRICING EXCEL SPREAD SHEET NAME | 004X004D025PRICES |
| DISK EXCEL SPREAD SHEET NAME | 004X004D025discs |

SELECTION INTERFACE SYSTEM

CLAIM FOR PRIORITY TO RELATED APPLICATIONS

This application is a Continuation of U.S. patent application Ser. No. 10/444,329 filed 22 May 2003 now U.S. Pat. No. 7,254,785, which is a Continuation in Part Application claiming priority from U.S. application Ser. No. 10/357,803, filed 3 Feb. 2003 now U.S. Pat. No. 7,207,013, which is a Continuation Application claiming priority from U.S. application Ser. No. 09/507,474, Feb. 17, 2000 now issued as U.S. Pat. No. 6,552,739, Issued 22 Apr. 2003.

BACKGROUND OF THE INVENTION

1. Technical Field

The present invention relates to selection interfaces. More specifically, the present invention relates to selection and display interfaces implemented on a computer or across a network, whereby a user can select and gain access to an image or other information related to an item or class of items having multiple properties.

2. Description of the Prior Art

The selection of products, parts, commodities, or other selectable items is commonly a laborious and time-consuming process, whereby a user or shopper is required to navigate and sort through numerous items that do not even remotely meet the user's requirements. For example, on a merchandising system implemented on a computer, e.g. through an Internet website, while a user may have an indication of one or more desired features of an item, the user is required to navigate through a large array of products, typically presented as lists of one or more items in a category. If a product name or brief description sounds remotely feasible, the user is then typically required to navigate to more detailed information regarding the item. An exemplary product category, which presents a multitude of selection choices, is that of wire mesh products. Wire mesh and wire cloth come in many different combinations of weave, material, mesh sizes, and wire diameter. Although hundreds of thousands of different combinations are possible, it may not be practical for a particular supplier to offer all the combinations. Some combinations of weave, material, mesh sizes, and wire diameters are also not manufacturable, e.g., a wire diameter that is so large the mesh openings are closed up or impossible to weave.

Buyers can often make ordering mistakes in selecting a wire mesh or cloth because the impossible or unavailable combinations are sometimes too subtle to understand. Ordering the wrong thing can be frustrating for all those involved. The Internet now makes it possible for users to log onto a business' website to select and order products.

Suppliers like TWP, Inc. (Berkeley, Calif.) offer at least three families of mesh materials, e.g., woven wire mesh, welded stainless steel mesh, and galvanized hardware cloth. The woven wire mesh includes a range of traditional to ultrafine, high-tech alloy, screen materials. The welded stainless steel mesh is a strong, precise material with an accurate grid pattern and relatively large holes. The galvanized hardware cloth includes a range of steel mesh protected by a heavy-duty zinc coating, e.g., for use in outdoor and industrial environments. Such materials are conventionally stocked in 36-inch and 48-inch wide rolls in 100-foot lengths. But rolls up to 300-inches wide can be bought on special order.

Wire cloth is the proper name for what is commonly called screen mesh. Such material is known for its high strength, wear resistance, ability to withstand high temperatures, and long service life. Wire cloth is woven like textile cloth. So-called market grade wire cloth are woven wire meshes suitable for general purpose work.

Materials that can be used include stainless steel type 304, brass, or copper. A line of special woven meshes are available in stainless steel type 316, aluminum, bronze, inconel, nickel, steel, and epoxy-coated steel. The user's choice of metal is determined by the product-operation environment and constraining cost considerations.

The wire-mesh hole size, e.g., the distance between two adjacent parallel wires, is a function of both the mesh count and the wire diameter. Changing either will change the opening size. The usual opening sizes vary from one-inch openings down to microscopic. The choice of a wire-mesh opening size is determined by the desired sizes of objects to be retained or allowed to pass through. The mesh is the number of openings in a linear inch, measured from the center of one wire to a point one-inch distant.

Two weaves are conventionally available, plain and Dutch weave. The plain weave has an over-one/under-one weave. Such type of wire cloth has square or rectangular openings, and is the simplest and most common weave used in screening and separating applications. The Dutch weave is woven with two different wire sizes, to produce wedge shaped openings. Such weave is generally considered stronger than plain weave and is often used in filtration.

The typical welded stainless steel wire mesh is formed of wires that are fused together at their junctions onto a grid. Automatic welding machines are used that accurately position all the shorter (weft) wires over the longer (warp) wires and spot-weld the intersections. These special machines can produce strong, consistent welds without any burning or discoloration.

The standard welded-stainless-steel-wire-mesh material is type 304 stainless steel because of its high corrosion resistance and strength at elevated temperatures. Type 304 stainless steel is also referred to as "18-8", meaning eighteen percent chromium (18% Cr) and eight percent nickel (8% Ni). TWP, Inc. also provides stainless steel types 304L, 316, 316L and other stainless steel alloys on request.

Standard welded wire mesh openings are always square or rectangular, and range from 0.218 inch and 0.979 inch. Meshes from 4-mesh to 1-mesh are usually stocked, and much larger meshes with 10-inch openings and 0.500 inch wire diameter can be obtained on special order.

Galvanized hardware cloth is typically used in partitions, grills, vents, cages and guards, wherever economical, sturdy, corrosion-resistant material is required. Galvanized hardware cloth is a lightweight, economical steel mesh that is protected from atmospheric corrosion by the application of heavy duty zinc coating, e.g., hot-dip galvanizing. The zinc coating encapsulates the mesh for excellent corrosion protection and a firm, non-raveling product.

The hardware cloth openings are relatively large compared to those of woven mesh, e.g., they range from 0.108 inch to 0.459 inch. The galvanizing process slightly decreases the opening size by about 0.004-0.006 inches. Several special hardware cloth specifications called vent meshes offer larger open areas for increased air flow rates. Readily available galvanized hardware cloth is stocked in 2-mesh, 4-mesh, and 8-mesh. Other special meshes are manufactured as required. The 2-mesh and 4-mesh is available woven or welded and the 8-mesh hardware cloth is woven.

There have been some basic purchasing and selection systems proposed in the prior art.

R. Burke, Computer System for Allowing a Consumer to Purchase Packaged Goods at Home, U.S. Pat. No. 6,304,855, describes "A system for generating images representative of a store shelf includes a retail space management system for generating information describing product and shelf sizes and locations in three dimensions, and including a code which is unique to each product. The products are typically commodity goods. A product database is used to store images of product packages which are accessible using codes unique to each product. A three-dimensional modeling and display system which takes size and location information from the retail space management system and generates three-dimensional models of each shelf and product and accesses the product database using the codes provided by the retail space management system to obtain images for each product. It generates a display of each product on each shelf by combining the obtained images and the generated three-dimensional models. The consumer may manipulate the display to change what is being viewed, to examine product packages and to purchase products."

M. Wilson, Full Alphanumeric Character Set Entry From a Very Limited Number of Key Buttons, U.S. Pat. No. 6,031,471 describes "A graphical machine-user interface includes a processor connected to a display screen to generate a screen display of individual items in groups together with the selector indication. The processor and a display screen are used to advantage to provide a rich keyboard function from a very limited set of pushbuttons. For example, five pushbuttons indicating "up", "right", "down", "left", and "middle" are recursively used to reduce a large two-dimensional matrix of item choices presented on the display to some subset, e.g., a top, right, bottom, left, or middle subset. If the reduction results in a choice of one, then that item is selected and output automatically. If the reduction results in a subset with more than one item, then a recursive process is used in which the selection process is repeated until the selected subset is reduced to a single item."

As well, there have been selection and control interfaces disclosed in the prior art for menu selection or feature control of consumer devices, such as for phone sets, digital music players, and for personal computer controls.

FIG. 1 is a schematic view of a telephone control interface 10, similar to BEOTALK™ telephone products, available through Bang & Olufsen, Inc. A plurality of feature buttons 12a-12e provide a selection of a parameter to be controlled on the device 18, while a control 14 and a go button 16 provide an interface to control a selected parameter, e.g. such as a headset volume control. A display 20 is provided, such as to indicate a control level. A supplementary display 22 may also be provided, such as to provide selection-sensitive information 24.

FIG. 2 is a schematic view of an interface 30 for a digital music player 32, similar to an interface of a portable iPod™ digital music player, available through Apple Computers, Inc., of Cupertino, Calif. A rotatable dial 38 and select button 40 allow selection 52a-52c within one or more menus and or submenus 50a-50j, such that a user can navigate and highlight play lists or other system menu items. In some operation modes, the dial 40 is used to adjust operation parameters, such as play volume. As a user navigates through the menus or controls operation parameters, a display 36 provides a graphic representation of the menus or control parameters. Other buttons 42,44,46,48 are typically provided, such as to navigate to the beginning or end of a song or play list.

A connectable USB-compatible PowerMate™ knob selector, available through Griffin Technology, Inc., comprises a knob that is used as an assignable controller in conjunction with a computer. The assignable knob selector is used in conjunction with internal software, such for controlling one or more parameters within an application, for shuttling between applications, and/or for controlling operating system parameters.

While graphic user interfaces and selection devices have provided basic means for selection for various devices, there is presently no interface and/or device which provides an integrated selection and display interface, whereby a user can quickly search, sort, and/or select. The development of such a system would be a major technological advance. Furthermore, there is currently no interface and/or selection device which provides an integrated selection and display interface, whereby a user can select and gain access to an image or other information related to a generic, i.e. available item/class of items having multiple properties, by which a most nearly matching item is selected from a universe of such items. The development of such a system would be a further technological advance.

SUMMARY OF THE INVENTION

A user selection interface system comprises one or more circular selectors linked to selectable characteristics, and a display linked to the selectors, for display of an image which corresponds to the selected characteristics. The interface is typically linked to a database comprising stored image and other information which corresponds to the selectable characteristics, whereby an image that corresponds to an item which meets a selected characteristic is retrieved and displayed. Information other than the image which corresponds to the selectable characteristics may also be retrieved and displayed. In some embodiments, the stored images comprise a single image, which matches all the selected characteristics. In alternate embodiments, the displayed image comprises a composite image that is based upon stored images which correspond to different selected characteristics. In some embodiments, the user selection interface comprises a graphic user interface. In alternate embodiments, the user selection interface comprises a mechanical interface. Some preferred embodiments of the user selection interface provide links for merchandising functions, such as for ordering, purchasing, inventories, and/or shipping.

BRIEF DESCRIPTION OF THE DRAWINGS

FIG. 6 is a schematic view of a dial selection and display interface;

FIG. 22 is a diagram that represents a design form for a third product page; and FIG. 23 is a diagram that represents a design form for a fourth product page.

DETAILED DESCRIPTION OF THE INVENTION

Figure 3:
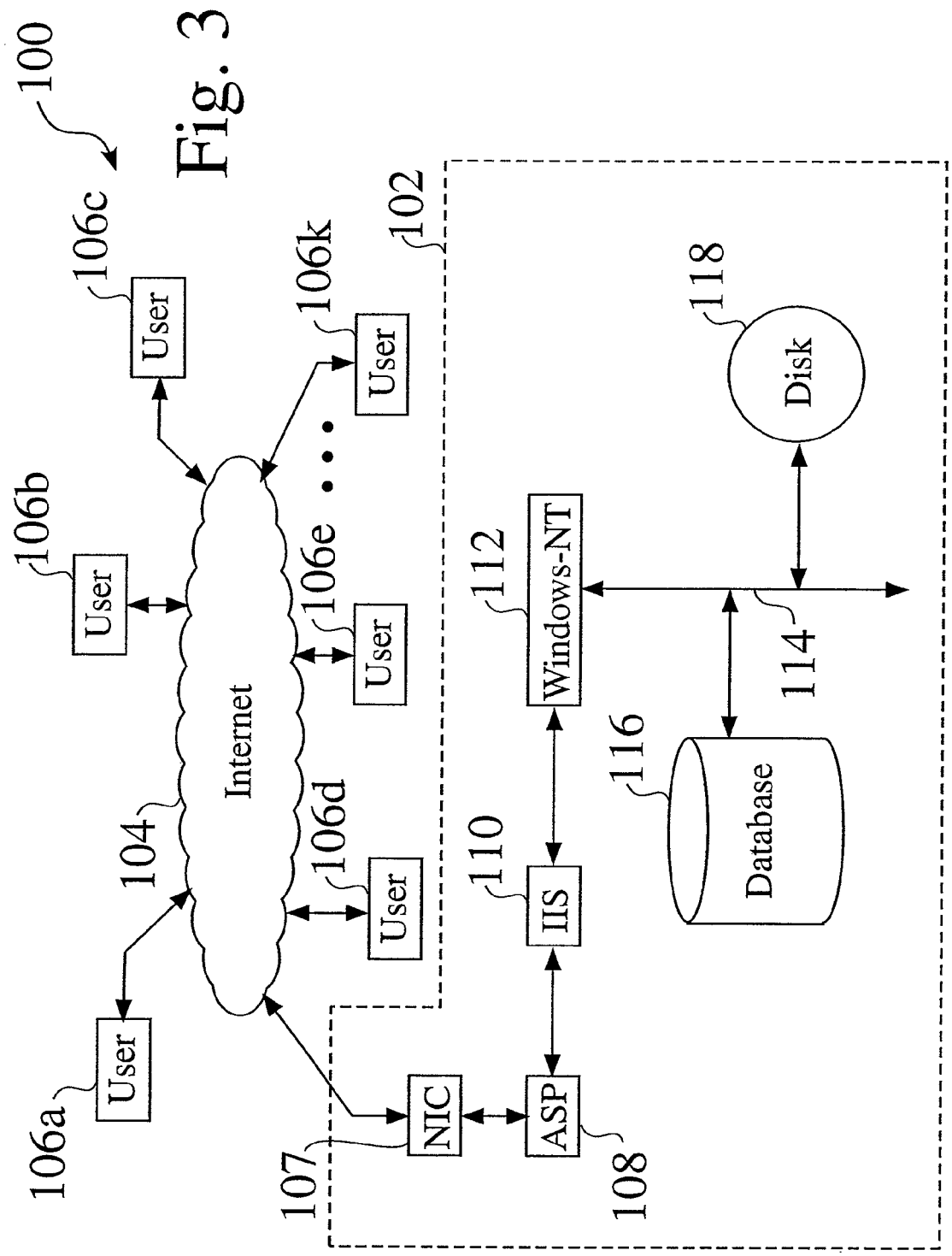
FIG. 3 is a functional block diagram of a selection and merchandising system, implemented across a network.

FIG. 3 illustrates an Internet wire-mesh merchandising system embodiment of the present invention, referred to herein by the reference number 100. The system 100 comprises a webserver 102 connected to the Internet 104 and many clients or shoppers 106a-106k. The web server 102 interfaces to the Internet 104 with a network interface controller (NIC) 107. An interactive webpage user interface 108 provides functionality similar to Microsoft Corporation (Redmond, Wash.) Active Server Pages (ASP). An Internet file and server 110, such as Microsoft Internet Information Server (IIS), runs under control of an operating system 112, e.g. such as Microsoft Windows-NT server. The ASP 108 and IIS 110 together generate a web presence on the Internet. An expansion bus 114 supports a database 116 and a general purpose storage disk 118. Various Microsoft Windows-NT services can run without requiring a user to be logged on to the system, e.g. Microsoft SQL Server, Microsoft Exchange Server, Dynamic Host Interface Protocol (DHCP), and even Windows Internet name Service (WINS) servers. These are preferably stored in disk 118.

The internet wire-mesh merchandising system 100 is readily adapted to a wide variety of networks, processors, and operation system environments, wherein information, such as a product image, is changed to reflect a current selection. For example, while some system embodiments 100 comprise HTML pages which are pulled in response to a selection, the Internet wire-mesh merchandising system 100 is readily integrated into other environments. Some current system structures pull, i.e. call, information from the database 116, such as through a job description in My SQL and PHP, wherein images are retrieved from an SQL database and are displayed in response to JAVA commands.

Figure 4:
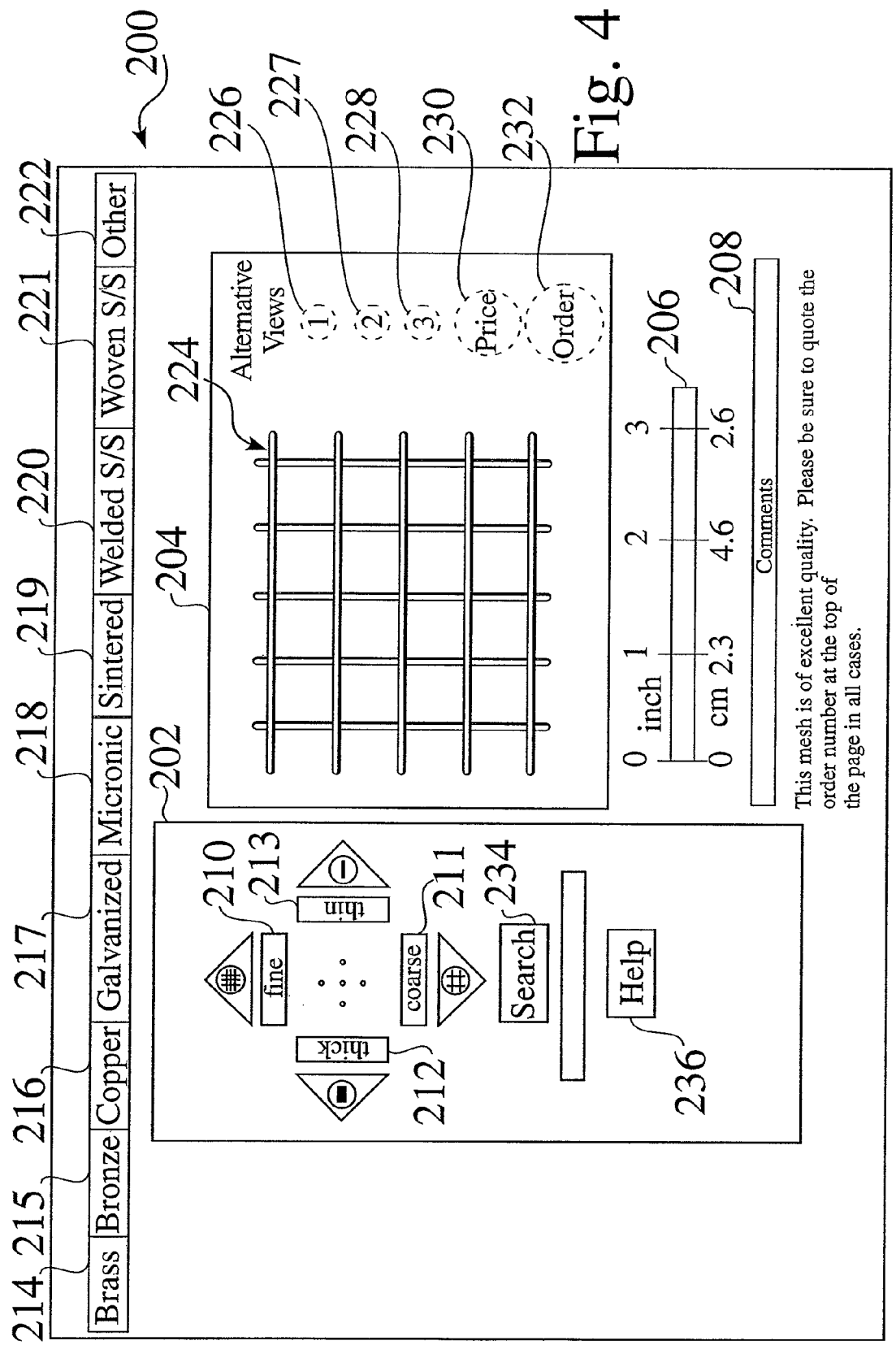
FIG. 4 is a diagram of a graphical user interface for a product page display on a web browser operated by a user at a network client site.

FIG. 4 represents a graphical user interface (GUI) 200 that is presented to an Internet user on a web browser, e.g. Netscape Communicator and Microsoft Internet Explorer. Such GUI is generated by the ASP 108 and IIS 110 (FIG. 3) when the user logs on to the uniform resource code (URL) address of the website operator. The GUI 200 typically comprises a navigation window 202, a sample-picture window 204, a ruler 206 for scale, and a comments field 208. The navigation window 202 permits the user to navigate through wire-mesh product samples that have finer mesh, coarser mesh, thicker wires, and thinner wires, e.g. by clicking on a set of hyperlink buttons 210-213, respectively. The material used in the wire-mesh product pictured in window 204 can be selected by clicking on any of the several buttons 214-222, e.g. such as brass 214, bronze 215, copper 216, galvanized 217, micronic 218, sintered 219, welded stainless steel (S/S) 220, woven stainless steel 221, and other materials 222. It may occur that meshes and wire sizes available in one material may not be available in another material. Amplifying remarks about the wire-mesh product currently selected are provided in the comments field 208.

The website design is such that the discrete products the user can view are those that the seller operating webserver 102 is offering for sale, or at least are those that the seller can actually produce and deliver.

The ruler 206 is a scale provided for the user to understand a picture 224 of a wire-mesh product being presented in window 204. Alternative views of the product, if available, can be accessed by clicking on a set of alternative view buttons 226-228. Such alternate views are presented instead of an initial sample product in picture 224. If a user is curious about the price of the product currently displayed in picture 224, a price button 230 is used to go to a webpage with current pricing. An order button 232 can be clicked-on to take the user to a product ordering webpage. A search button 234 and a help button 236 are provided for navigation help.

Figure 5:
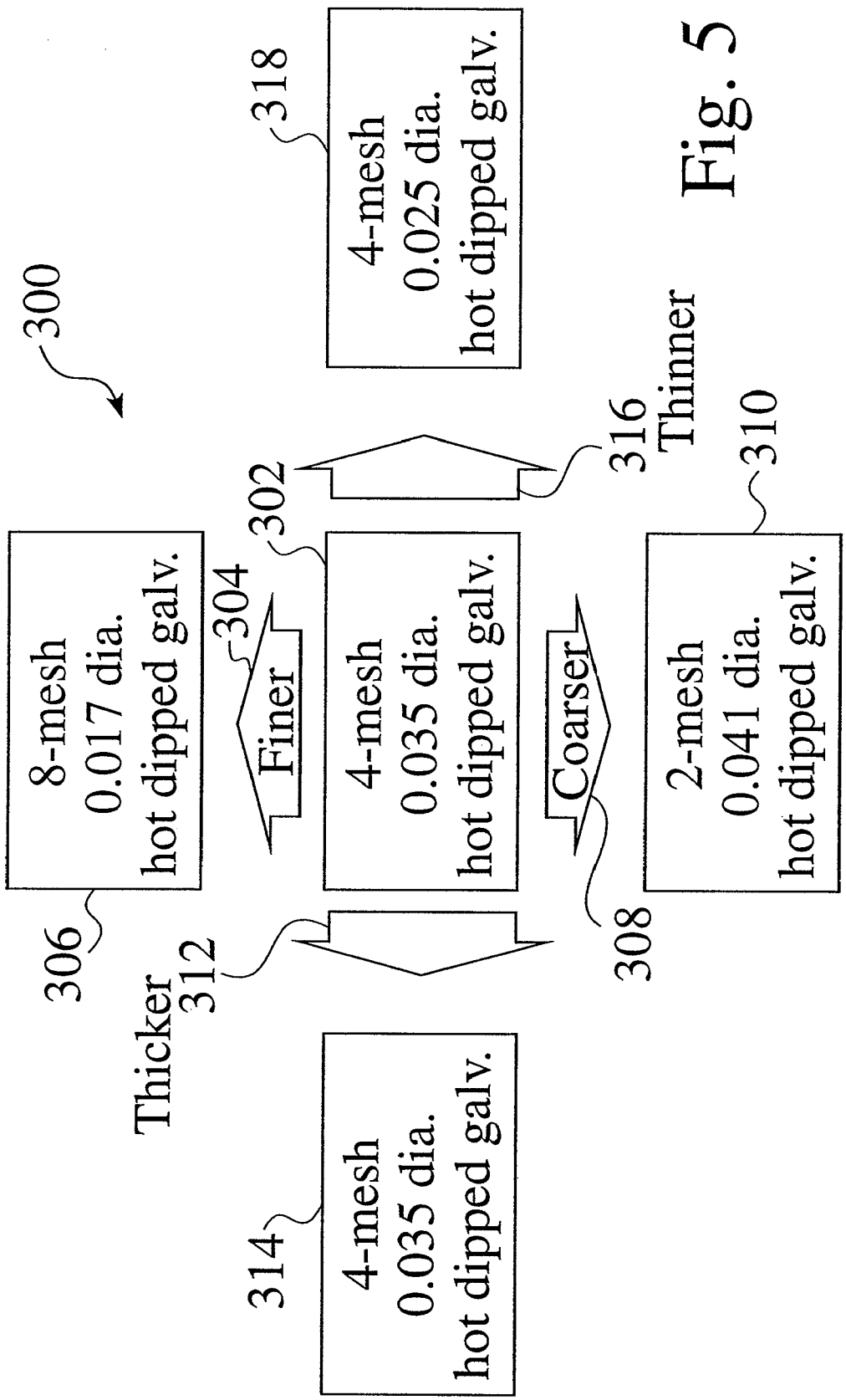
FIG. 5 is a flew diagram that represents the navigation that occurs between product pages as a result of a user clicking on any of four hyperlink buttons for finer, coarser, thicker, and thinner.

A dataflow 300 in FIG. 5 represents the effects of finer-mesh, coarser-mesh, thicker-wires, and thinner-wires hyperlink buttons 210-213 (FIG. 4). For example, a starting position 302 is for a hot-dipped galvanized 4×4 mesh with 0.035" diameter wire. A finer navigation direction 304 takes the user to a hot-dipped galvanized 8-mesh with 0.017" diameter wire in a position 306. Such represents the only choice for finer (higher count) mesh. A coarser navigation-direction 308 takes the user to a hot-dipped galvanized 2-mesh with 0.041" diameter wire in a position 310. Such represents the only choice for coarser mesh from a starting position 302. A thicker wire is not necessitated by requesting a coarser (lower count) mesh, but the thicker 0.041" represents the only product configuration the seller chooses to produce and sell. A thicker navigation-direction 312 points to a no-link position 314. Such occurs when there is no available product choice in that direction. A thinner navigation-direction 316 takes the user to a hot-dipped galvanized 4-mesh with 0.025" diameter wire in a position 318. Such represents the next choice for thinner-wire mesh from the starting position 302. The mesh count remains at 4-mesh.

In some system embodiments, the dataflow shown in FIG. 5 is used by a web designer to implementing the web server 102 (FIG. 3). Some detailed implementations further comprise webpage fill-in forms like those illustrated in FIGS. 20-23. A commercially marketed computer program sold by Filemaker, Inc., called FILEMAKER-PRO, provided good results for such forms.

User Selection Interface System. FIG. 6 is a schematic view of a dial selection and display interface system 400a. A plurality of feature dials 404a-404j are circular or orbital, i.e. they define a continuous selection path that proceeds about an axial center point, as with a rotatable tuning control or selector switch, either as a visual graphic user interface, e.g. such as within a web page, or alternately as a mechanical interface, e.g. such as on a dedicated device having a selection interface 400. Within the graphic user interface 400, a user can select and hold a dial 404, such as with a mouse or trackball, and move the dial 404 to incrementally change the selection 514 (FIG. 10), as well as the characteristics of the image 410.

Figure 10:
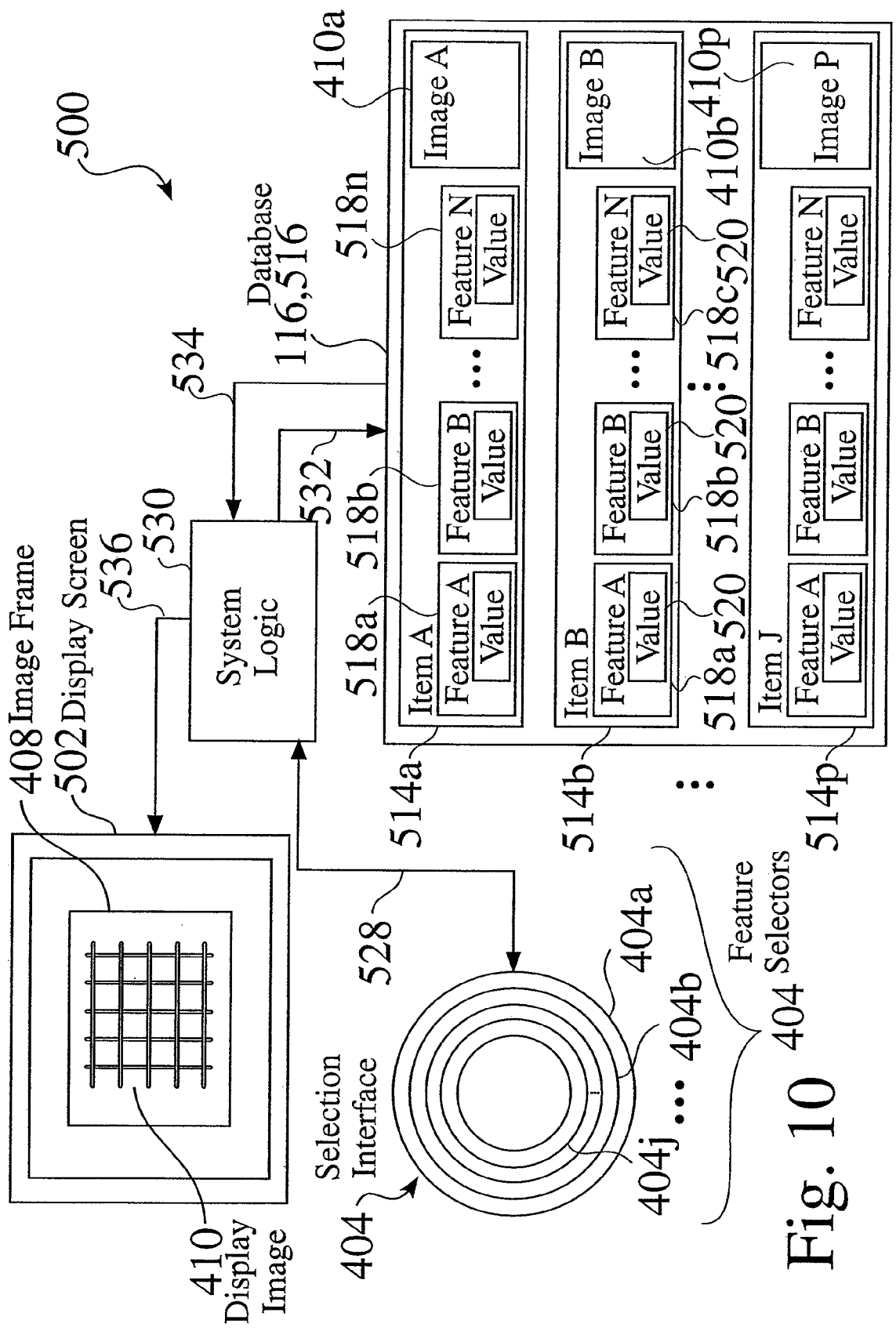
FIG. 10 is a functional block diagram of a selection interface system comprising storage, navigation, and display of items matching selected criteria.

The user selection interface system 400, such as 400*a* seen in FIG. 6, provides a powerful and intuitive interface, through which a user can quickly make one or more selections 514, from a universe of available items 514 (FIG. 10). An integrated display 408, such as to provide an image 410 and/or other information 413 for an available item 514, is preferably provided, such that a user may readily navigate to one or more desired items 514.

In some embodiments of the user selection interface 400, the dials 404 are controllable to adjust the speed or sensitivity by which different selections are queried and or displayed 410,412. For example, in a "fast dial" position, the search and display of available items 514 is performed with a high dial sensitivity, e.g. a small dial movement may yield the search and display of one or more new available items 514. Similarly, in a "slow dial" position, the search and display of available items 514 may be performed with a controllably slower or buffered dial sensitivity, e.g. a larger dial movement or a cease in dial movement may be required to search and display of one or more new available items 514. As well, the dials may further comprise a "tap" feature, whereby a tap motion in either dial rotation direction may automatically move the system to a next available item 514.

In some embodiments of the selection interface system 400, the dials 404, i.e. selection wheels 404, appear to rotate when selected and moved. In alternate embodiments of the selection interface system 400, the dials 404 simply appear as a ring at which a mouse 547 (FIG. 12) is pointed. As well, in some system embodiments, one or more dials 404 may directly correspond to a track ball, mouse, or other pointing device, such as to a dedicated mechanical dial. Furthermore, a touch screen display 510 may preferably provide a corresponding motion of dials 404 to the movement of a stylus or a finger. In alternate system embodiments 400, one or more dedicated devices with actual rotation selection wheels 404 are movable, such as with a finger or by other body motions.

In some embodiments of the selection interface system 400, two or more dials 404 can be locked together, so that their characteristics turn in unison. In some alternate system embodiments 400, one of the dials 404 is selectable to select, i.e. toggle the characteristics of the other wheels 404. For example, as a user turns the master wheel 404, a label on an inner wheel 404 changes functions, i.e. features 406, such as but not limited to transitions from color to shape, from shape to weight, or from weight to price.

As seen in FIG. 6, the selection dials 404*a*-404*j* correspond to a plurality of features 406*a*-406*j*, whereby a user can view, select, compare and/or purchase one or more items that match the selected features 406. For example, the features 406*a*-406*j* shown in FIG. 6 correspond to one or more vehicles 423 (FIG. 8), which meet gas mileage 406*a*, color 406*b*, and/or price 406*j*. A user U can readily move the dials 404, as desired, to navigate to a desired selection 514.

Figure 15:
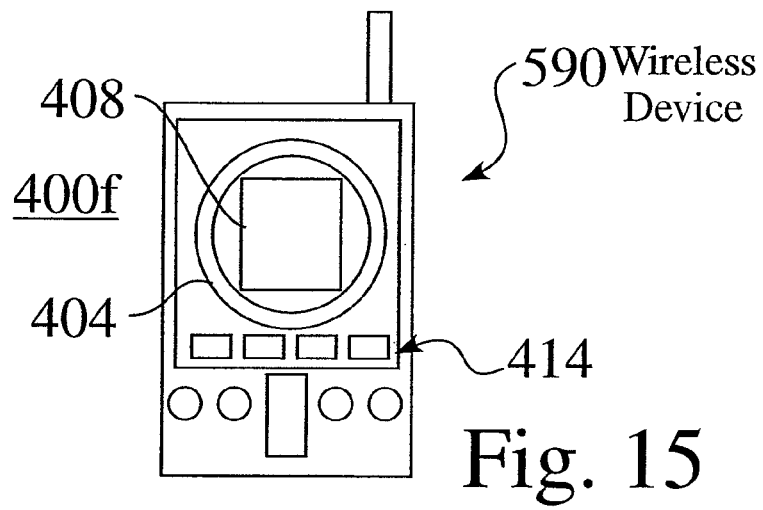
FIG. 15 is a schematic view of a remote device selection interface.

The wheels 404 or the buttons 414 of the GUI are readily implemented on wireless cell phone type devices, as well as kiosks 574 (FIG. 12), table tops 106 (FIG. 12), video games 600 (FIG. 16), machine control interfaces 610 (FIG. 17), or remote control devices 590 (FIG. 15). The image 410 that is shown may be either a static image 410 that is pulled from a database 116,516 of images 410, or a composite image 410 which is generated on the fly.

As seen in FIG. 6, the dial selection and display interface 400*a* also comprises a display window 408, whereby one or more images 410 that correspond to a selection 514 are displayed for a user U. Furthermore, other information 412 which corresponds to a selection 514 is also displayed, such as an item name 413*a*, a price 413*b*, and/or other information 413.

Figure 7:
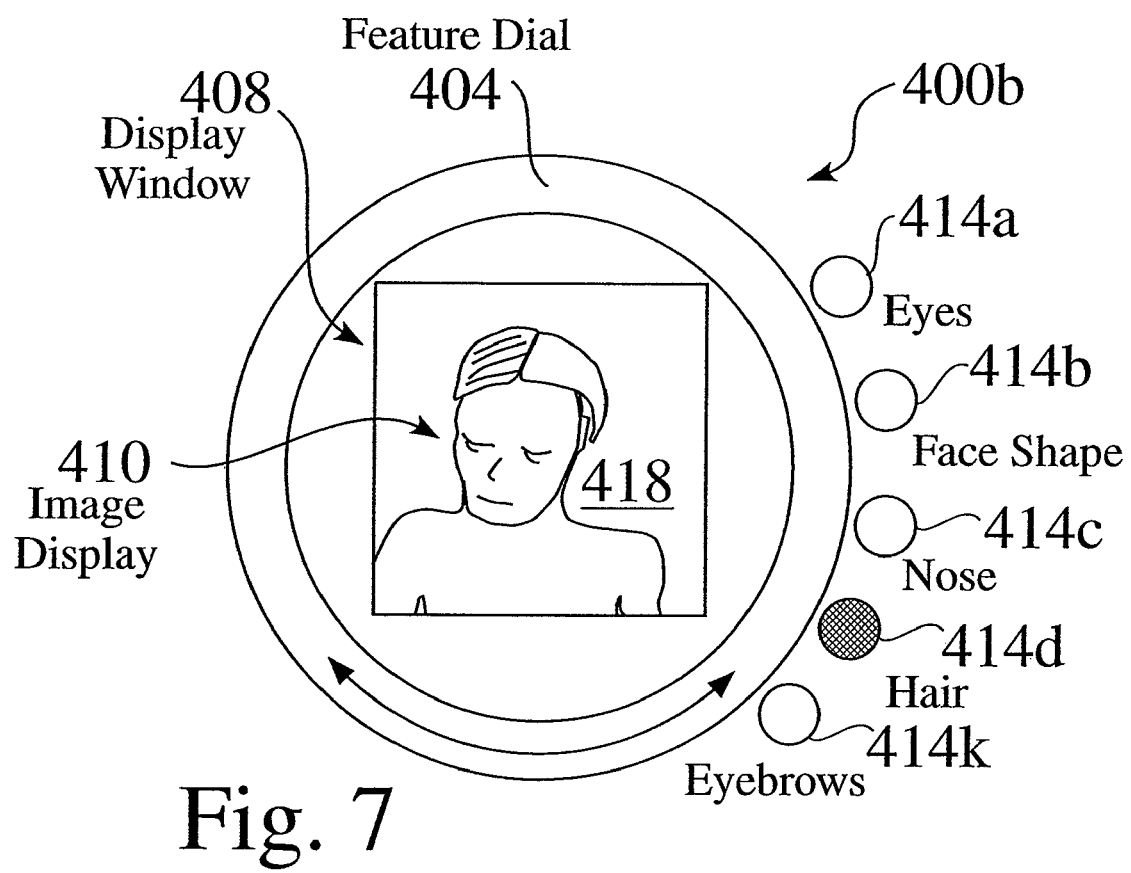
FIG. 7 is a schematic view of a dial selection and display interface having a plurality of dials.

FIG. 7 is a schematic view of a dial selection and display interface 400*b*, comprising a feature dial 404 and a plurality of feature toggles 414*a*-414*b*. The exemplary user selection interface 400*b* shown in FIG. 7 is implemented for composite human images 418, such as for criminal profiling. In use, one or more of the toggles 414*a*-414*k* within the selection interface 400*b* are typically activated, whereby the feature dial 404 becomes active to control a feature 406 (FIG. 6) which corresponds to an active toggle 414. For example, in FIG. 7, the hair toggle 414*d* is currently active, such that rotation of the dial 404 changes hair features 406 of the composite image 418. Similarly, activation of the face shape toggle 414*b* allows the dial to control a face shape feature 406 of the image 418. In alternate embodiments of the dial selection and display interface 400*b*, a toggle 414 can preferably cycle through a plurality of active features 406. As well, a feature sensitive dial label or icon may preferably appear on or near the feature dial 404, to indicate a currently active, i.e. selected, feature 406.

In a system embodiment 400*b* which provides a composite image 418, based upon user selections 404,414, selected feature values 520 (FIG. 10) are retrieved from a database 116, 516 (FIG. 10) and are composited to produce an image 418, such as by layering feature values 120, such as by opaque or translucent, i.e. sprite, layering. In an alternate embodiment 400*b*, features of known people, e.g. such as known criminals, are quantized and/or categorized and stored, such that as a user navigates through facial features, images of one or more people which match the feature set may be presented 418 within the display window 408.

Figure 8:
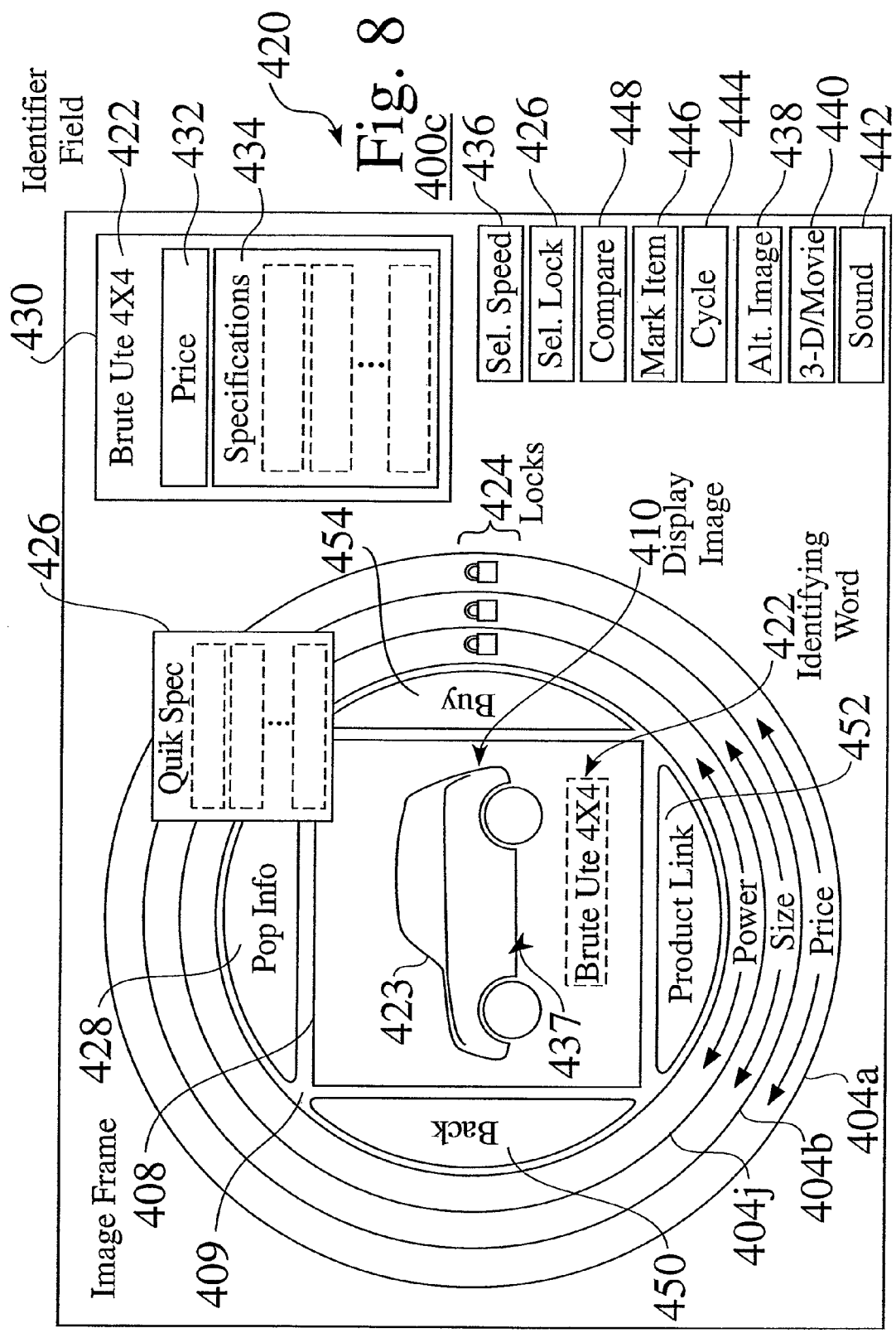
FIG. 8 is a detailed schematic view of a dial and display selection interface.
Figure 9:
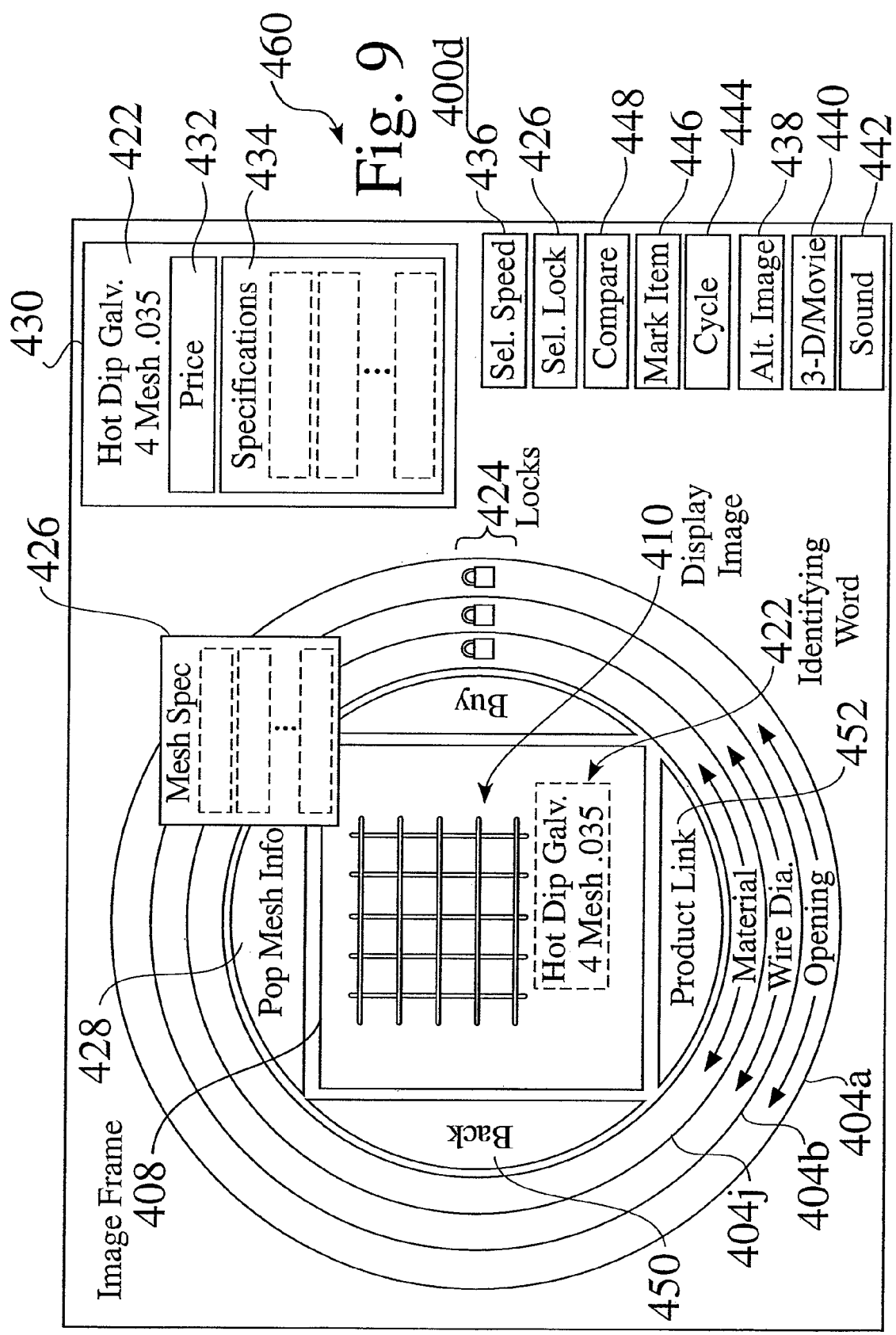
FIG. 9 is a detailed schematic view of an alternate dial and display wire mesh selection interface.

Detailed System Embodiments. FIG. 8 is a detailed schematic view of a dial and display selection interface system 400*c*. FIG. 9 is a detailed schematic view of an alternate dial and display wire mesh selection interface 400*d*. The selection interface systems 400*c*,400*d* are preferably implemented as a user interface implemented through a web browser, such as for selection, sales, and/or marketing across the Internet.

Figure 11:
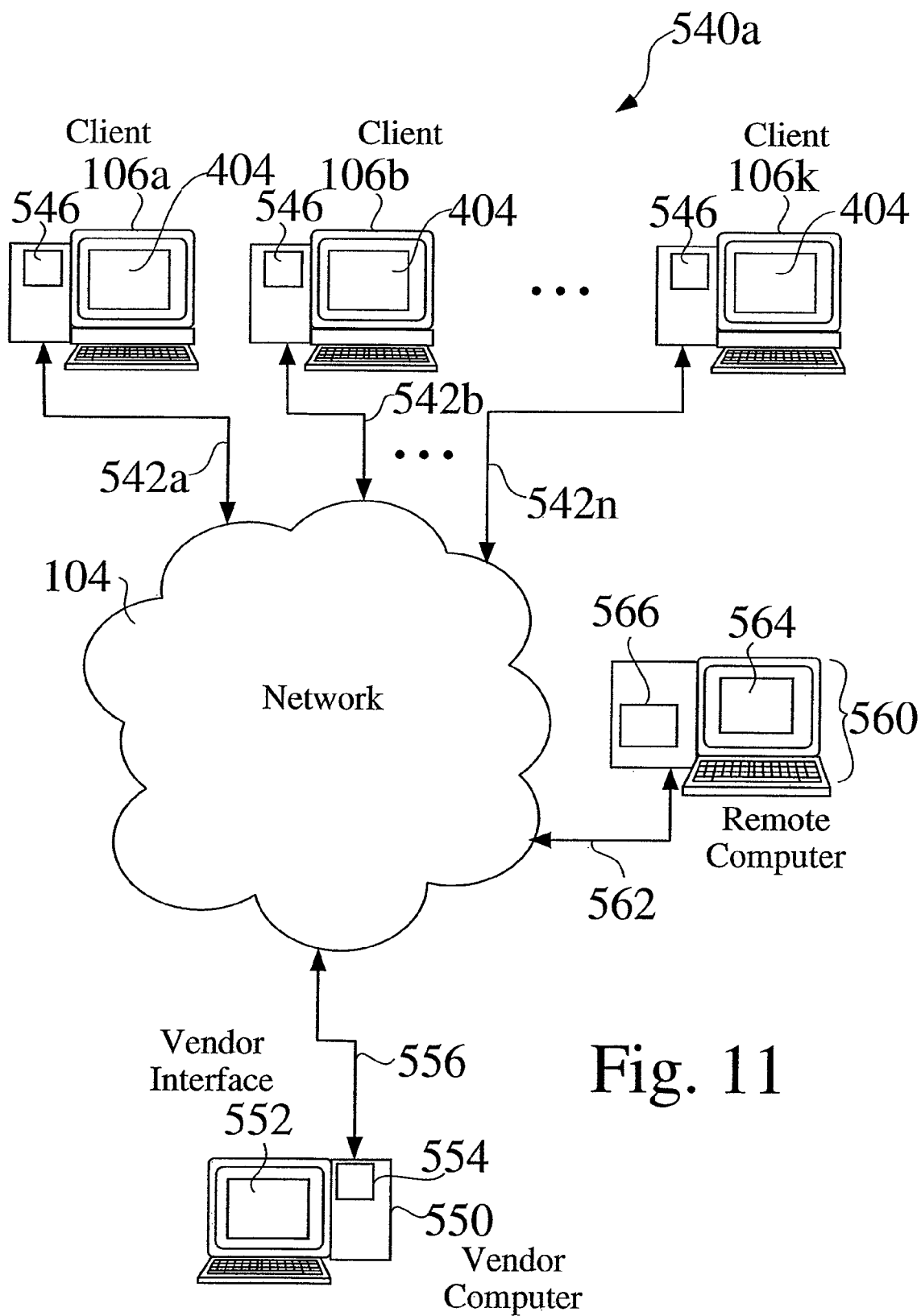
FIG. 11 is a schematic view of selection and merchandising system, implemented across a network on one or more client computers.
Figure 12:
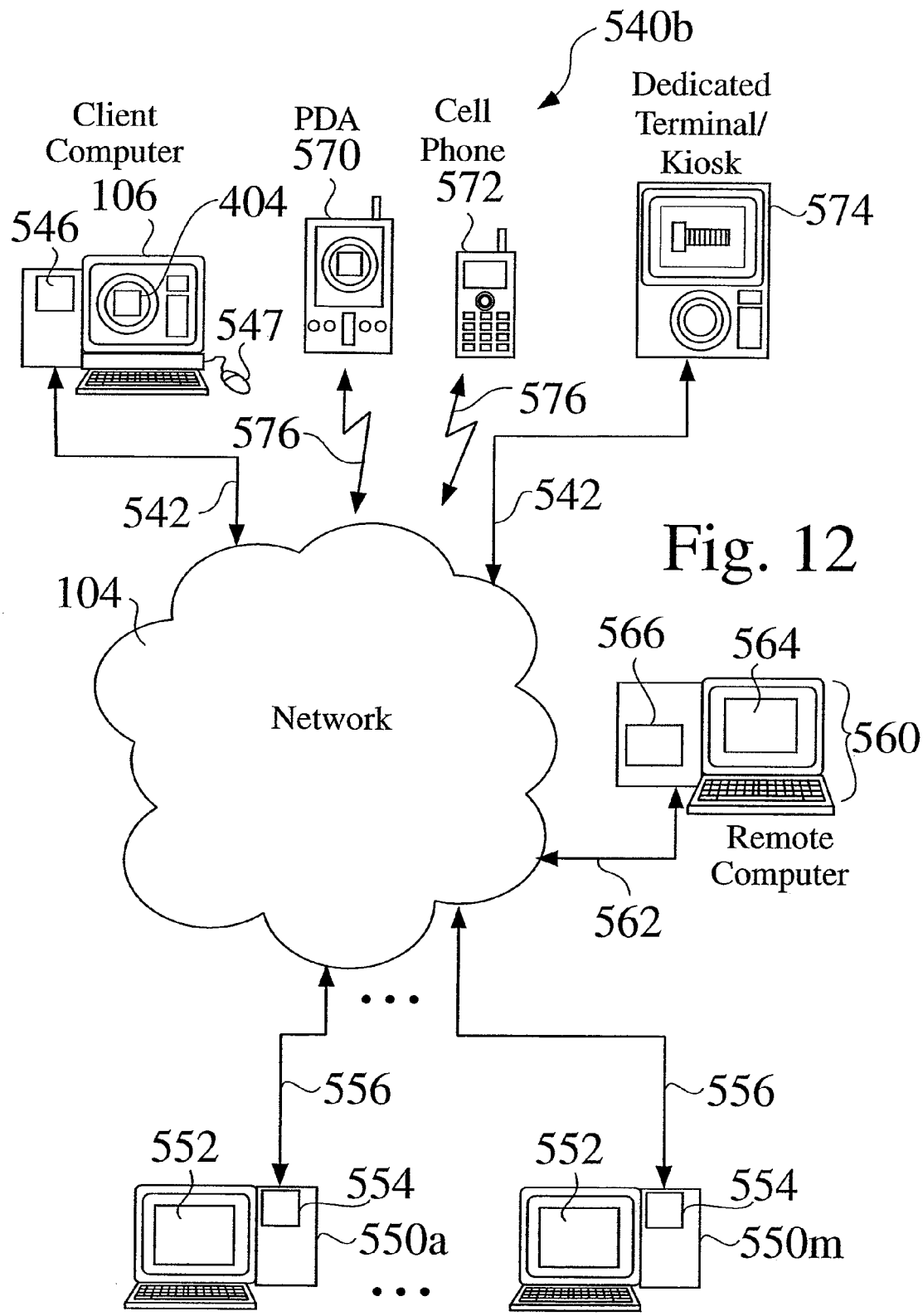
FIG. 12 is a schematic view of selection and merchandising system, implemented across a network on various client devices.

The exemplary dial and display selection interface system 400*c* shown in FIG. 8 provides an interface by which a user can readily browse through vehicle products 423. While some embodiments 400*c* are used for merchandising the vehicles 423 of one manufacture, such as through a single vendor computer 550 (FIG. 11), alternate system embodiments 400 are readily implemented to merchandise vehicles 423 from a variety of manufacturers, such as through a plurality of vendor computers 550*a*-550*m* and a remote, i.e. host computer 660 (FIG. 12).

As seen in FIG. 8, the dial and display selection interface system 400*c* comprises a plurality of feature dials 404*a*-404*j*, which are rotatable within the graphic user interface. The dials 404*a*-404*j* are adjustable to select from various items 514 (FIG. 10), e.g. such as vehicles 423, which meet desired selection parameters 406, e.g. price, power, and/or size. For example, a user may initially select vehicles 423 with a size parameter 406*b*, and may subsequently select from those vehicles 423 to find vehicles 423 which meet a price selection 406*a*. From the vehicles 423 which meet both size and price selections 406, the user may then adjust other selection dials 404, such as a power dial 404*j*, to select other desired characteristics 406.

The dial and display selection interface system 400c further comprises an image frame 408, such as within an inner region 409 defined within one or more concentric dials 404a-404j. A display image 410 is typically retrieved and displayed, whereby a user can see a photograph or illustration of a currently selected item 514. Other information 422 related to the current selection 514 may also be shown, such as embedded within the image frame 408, either as part of the image 410, or composited over the image 410. The embedded information 422 typically comprises one or more embedded words, such as a product name, a product number or code, or other item specifier 422.

As well, other information regarding the selected item 514 may readily be seen and/or accessed, such as through a quick specification window 426 or other field 426 near the image 410, e.g. either to appear automatically, as a user moves a mouse cursor 437 over the image 410, or to appear through a pop info control 428. For example, in the dial and display selection interface system 400d implemented for merchandising wire mesh products, an information button or glyph 428 is located near the image frame 408, such that activation reveals information about the a selected mesh.

Additionally, an information screen 430 may be provided, whereby information is readily displayed for the user, such as to display a product name 422, pricing information, 432, or other specifications 434. In some system embodiments, the information screen 430 appears once a selected item 514 is set, i.e. frozen.

As seen in FIG. 8 and FIG. 9, the dial and display selection interface systems 400c,400d preferably comprise a wide variety of selection enhancements. For example, selection locks 424 on one or more selection dials 404 allow a user to "lock" a selected parameter 406, such as price 406a, whereby only items which strictly meet a locked parameter 406 are presented to the user, while an unlocked parameter 406 may allow the system to approximate a parameter 406, based on available products 514.

In some system embodiments 400, a parameter which is not locked 424 is typically free to show all items 514 which meet the other controlled parameters 404,406. For example, in a system 400 for viewing criminal suspects, an unselected hairstyle feature allows the system to approximate any hair parameter 406, based on suspects who meet the other selected parameters 404,406. In some system embodiments 400, even if a user selects one hairstyle feature, an unlocked hair parameter 406 may allow the system to approximate a hair parameter 406, based on suspects who meet the other selected parameters 406.

In some system embodiments 400, locks 424 preferably provide either a hard lock 424, e.g. to rigidly specify a selection, or a soft lock 424, e.g. to specify an approximate lock 424. For example, in a soft lock condition 424, if a user selects "silver" as a color 506 of a vehicle 423 in a vehicle selection system 400c, the system 400c may show stock of similar "platinum metallic" or "gray pearl" colors, which may readily meet the user's needs. In a similar soft lock condition 424 of vehicle selection system 400c, a user selection of a price 506 may allow vehicles 423 which substantially meet a price selection 506, e.g. within a specified percentage or tolerance, to be displayed.

As seen in FIG. 8 and FIG. 9, the dial and display selection interface systems 400c,400d further comprise a selection speed control 436, to adjust the speed at which items are retrieved and displayed. A selection lock 426 allows a user to lock in a selected item 514, such as to freeze a selection 514 and corresponding image 410 for longer examination.

In some system embodiments 400, the images 410 light up, or highlight a purchase or shopping cart button 454, whereby a user may check stock, order, and/or purchase a selection 514. As well, a navigation button or product link 452 may be provided and preferably highlighted, whereby the user may navigate to other information either within a product section of the host site, or to a linked site. A back button 450 may also be provided, such as to toggle to previous selections 406 and/or selected items 514.

As seen in FIG. 8 and FIG. 9, the dial and display selection interface systems 400c,400d also preferably comprise mark item control 446, compare item control 448, and cycle items control 444, whereby a user can mark, compare, and/or toggle between selections 514. For example, in a motor vehicle selection site 400c, a user may want to compare features between three compact cars 514, either having the same or similar features 406, or having different selected features 506, e.g. the user may opt for a higher performance engine in one car 423, or a premium interior in another car 523, and then compare features.

Some embodiments of the dial and display selection interface systems 400c,400d also preferably comprise enhanced display and sound features, such as through alternate images 438, 3-D visualization or movie access 440, and/or through sound control 442. For example, through alternate images 438, a plurality of images 410 for a selected item 514 may be presented to a user, such as front, side, rear, and perspective views of a vehicle 423. Similarly, alternate images 410 of different items 514 which each meet the selection criteria may be cycled.

As well, before selection of parameters 406, the pictures 410 of a product section of a website may cycle thru a series of images that relate only to products 514 in that section, e.g. such as a sequential display of different product lines for a manufacturer. For example, upon approaching a kiosk 574 (FIG. 12, FIG. 14), a user may be presented with a series of sequential images 410 of available items 514. In a selection system 400c for selection of vehicles 423, a sequence of product families may be presented, e.g. such as sub-compacts, intermediates, luxury, sports, pickup trucks, station wagons, and/or SUVS.

Some embodiments of the dial and display selection interface systems 400c,400d also preferably comprise access to three-dimensional display, animation, or movie clip 440, such as to provide a walk-around view of a product 514, to provide a walk-through of a building, or to access multimedia information regarding one or more product features. As well, sound access 440 preferably provides sound information, such as narrative information, music, or other sound data 440.

System Operation. FIG. 10 is a functional block diagram of a selection interface system 400, which comprises storage, navigation, and display of items matching selected criteria. The database 116, 516 shown in FIG. 10 is populated with selectable information corresponding to a plurality of items 514a-514p. Each item component 514 comprises one or more features 518a-518n, within which is assigned a corresponding value 120, and typically comprises one or more corresponding images 410a-410p. While the exemplary database 116,516 shown in FIG. 10 is shown as a single database entity 116,516, the stored information can reside at one or more locations.

As seen in FIG. 10, a selection interface 404 comprises feature selectors 404a-404j, by which a user can readily navigate, select, view, compare and/or purchase items 514. As a user controls a feature selector 404, a selection signal 528 is sent to the system logic module 530. The database 116,516 is queried 532, to determine one or more items 514 which correspond to the combined selections 404a-404j. The results 534, which correspond to one or more matching items 514, comprise product information and images 410. which are returned 534 and displayed 536, either through the processor 530, or directly to the display screen 502. An image 410, such as 410a, is thereby displayed within the image frame 408.

While some system embodiments 100 comprise HTML pages which are pulled in response to a selection, the selection interface system 400 is readily integrated into other environments. Some current system structures pull, i.e. call, information from the database 116, 516 such as through a job description in My SQL and PHP, wherein images are retrieved from an SQL database 116,516 and are displayed in response to JAVA commands.

While the selection interface 404 shown in FIG. 10 is shown independently from the display screen 502, other embodiments of the user selection interface system 400 comprise an integral graphic user interface system 400, such as seen in FIG. 8 and FIG. 9.

Network Embodiments and System Administration. FIG. 11 is a schematic view of selection and merchandising system 540a, implemented across a network 104 on one or more client computers 106a-106k. FIG. 12 is a schematic view of selection and merchandising system 540b, implemented across a network 104 on various client devices, such as a computer 106, a wireless device 570, e.g. such as a personal digital assistant or a pocket PC, a cell phone 572, and/or a dedicated terminal or kiosk 574.

As seen in FIG. 11, a vendor computer 550 is connected to the network 104, and typically comprises a vendor interface 552 and vendor system module 554, such as to provide system operating software and/or database storage 116,516 (FIG. 10). Similarly, a remote computer 560 may also be connected to the network 104, comprising an administrative interface 564 and an administration module 564, such as to provide system operating software and/or database storage 116,516 (FIG. 10), either in conjunction to a vendor computer 550, or as a central administrator for multiple vendors 550.

A vendor interface 552 and computer 550 allows a vendor user to input item information, such as items 514, features 518, and feature values 520, as well as images 410, identifying words 422 (FIG. 8; FIG. 9), or other information 432 (FIG. 8; FIG. 9).

As seen in FIG. 11 and FIG. 12, while some embodiments of the selective interface system 400 are used for merchandising the items 514 of one manufacture, e.g. such as through a single vendor computer 550, alternate system embodiments 400 are readily implemented to merchandise items 514 from a variety of manufacturers, such as through a plurality of vendor computers 550, either in collaboration, or in conjunction with a remote computer 560. For example, the remote computer 560 shown in FIG. 12 may preferably be configured to as a host computer 560, to provide a merchandising and comparison interface 404 for client computers 106.

In a typical implementation of the dial and display selection interface system 400c, a home page comprises a main picture 410, which changes sequentially, through a group of pre-selected images 410. These images typically reside in a folder of images 410 that are currently used on the website. The unique image names 410 are typically chosen by a Webmaster, in advance of display to a website visitor, through a vendor interface 552 or a website administration interface 564, so that just the chosen images 410 are displayed. The images 410, as well as supplementary information, displayable to either a vendor user or and administrative user, such as to display information that is similar to that viewed by a client user, or to display information that is unique to a vendor user, such as but not limited to inventory values, profit margin information, bill of materials information, parts lists, and/or subassembly information.

The selection interface system 400 is readily adapted to a wide variety of networks, processors, and operation system environments, wherein information, such as a product image 410, is changed to reflect a current selection. For example, while some system embodiments 400 comprise HTML pages which are pulled in response to a selection, the selection interface system 400 is readily integrated into other environments. Some current system structures pull, i.e. call, information from the database 116,516 such as through a job description in My SQL and PHP, wherein images 410 are retrieved from an SQL database and are displayed in response to JAVA commands, such that the image 410 is changed, i.e. updated, in response to the selective controls 404.

Figure 13:
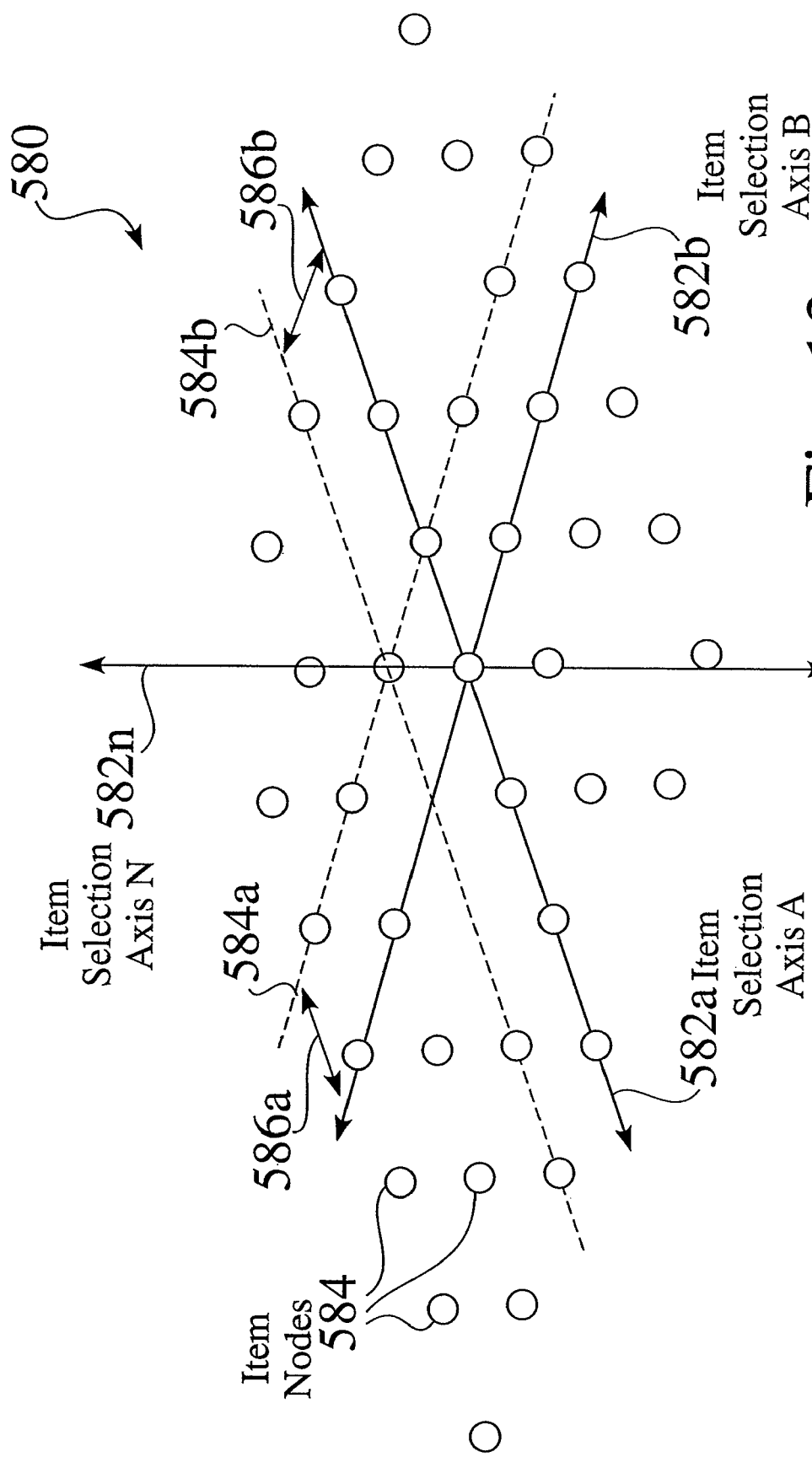
FIG. 13 is a perspective view of selectable nodes on a plurality of selection axes.

Item Selection Axes and Nodes. FIG. 13 is a perspective schematic view 580 of selectable nodes 584 on a plurality of selection axes 582a-582n. Within the user selection system 400, a user may quickly navigate and select one or more items 514 from a large plurality, i.e. a universe, of items 514, as represented by nodes 584 in FIG. 13. Selection dials 404 provide control on one or more selection axes 582, such as between product values 520 for features 518 (FIG. 10). The nodes 584 are separated 586, e.g. such as by 586a or 586b, such that a user is typically limited to select between node values 584, i.e. available feature values 120.

For example, in a wire mesh merchandising system 400d (FIG. 9), mesh values per inch are typically limited to either currently available meshes, or, upon special order, manufacturable meshes. Therefore, mesh values which are not manufacturable, or are not currently available, do not appear as a valid node 584. Through subsequent selection and control of selection dials 404, a user may quickly navigate to a mesh product which meets the needs of an end user and is also available or manufacturable.

Alternate Interfaces. While several embodiments of the selection interface system 400 are integrated within a client network environment, alternate embodiments of the selection interface system 400 provide an enhanced selection interface for a variety of networked and stand-alone applications. Furthermore, while some embodiments of the selection interface system 400 comprise a graphic user interface 404, alternate embodiments combine mechanical selection controls 404 with a display 408.

Figure 14:
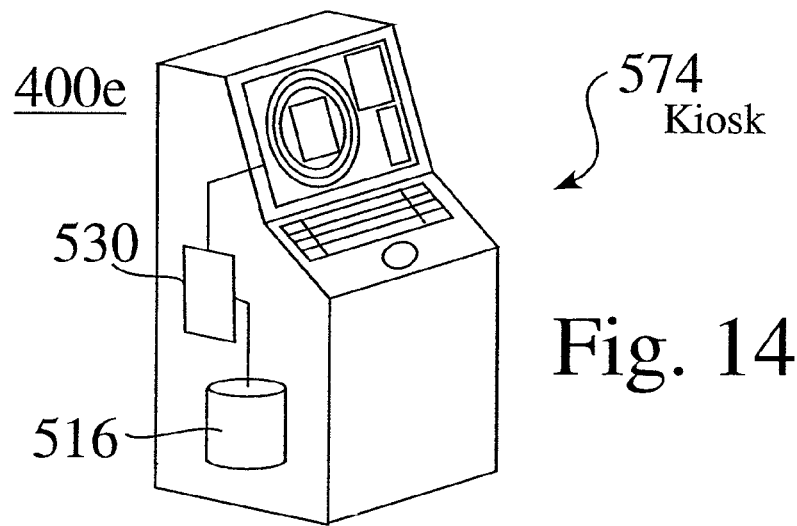
FIG. 14 is a schematic view of a stand-alone selection interface.

FIG. 14 is a schematic view of a kiosk 574 comprising a selection interface system 400e, which can either be networked 104, as seen in FIG. 12, or can function as an independent selection kiosk 574, with an internal processor 530 and database 516 e.g. such as for a store, a shopping center, a convention or a vending machine. In alternate kiosk embodiments 574, stored item, product, entity, or commodity information is updated periodically, such as to serve a point of service kiosk, e.g. such as for a store, a shopping center, or a convention.

FIG. 15 is a schematic view of a selection interface system 400f implemented on a wireless device 590, comprising a selection dial 404, feature toggles 414, and an integral display 408. The wireless device selection interface system 400f is readily adapted for a wide variety of applications. For example, a user may quickly search for and select a restaurant while traveling, e.g. by subsequently controlling toggles 414 for location, business, restaurant type, hours, budget, reviews, whereby the display 408 may suitably provide images of a map, restaurant logo, and/or review information.

Figure 16:
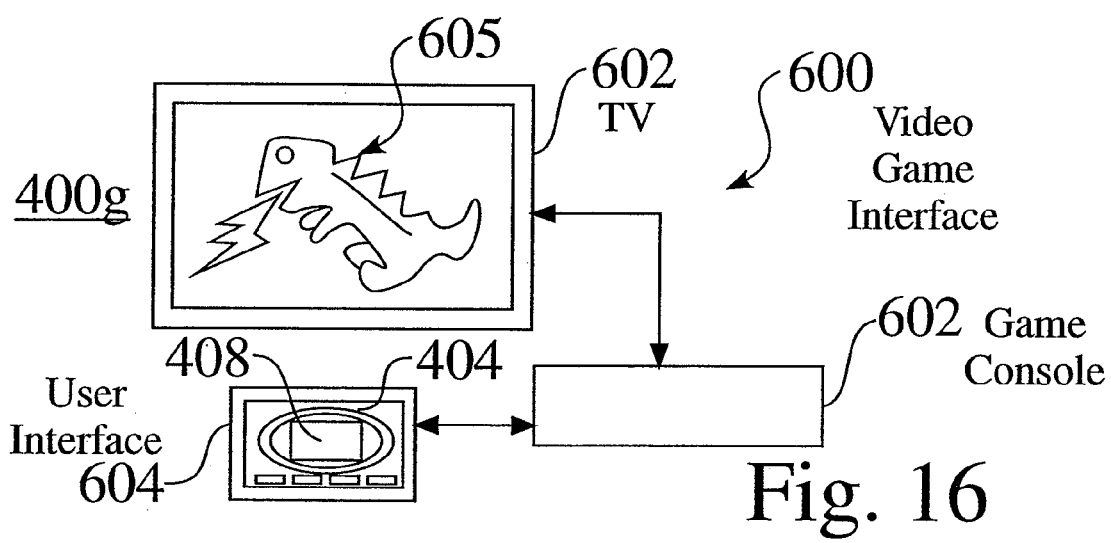
FIG. 16 is a schematic view of a game device selection interface.

FIG. 16 is a schematic view of a selection interface system 400g implemented on a game device 600, in which a user game interface 604 selects and controls game functions, such as through a game console 602 and a television display 602. As well, the selection interface system 400g may comprise a graphic user interface 404 (FIG. 10) on the display 602, for selection purposes within or peripherally to a game 605.

Figure 17:
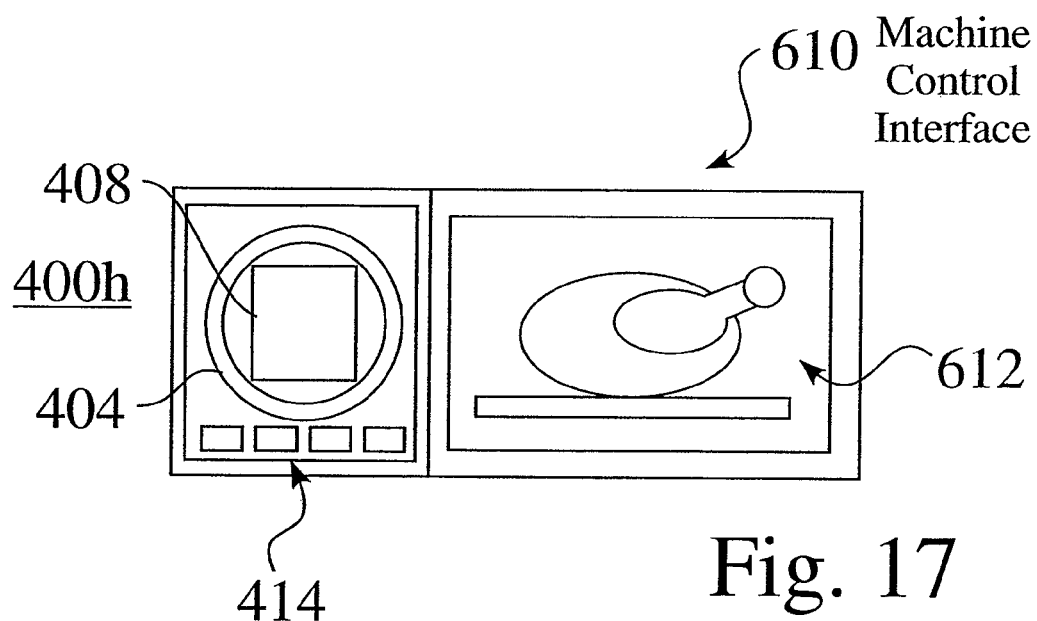
FIG. 17 is a schematic view of a machine control interface.

FIG. 17 is a schematic view of a selection interface system 400h implemented for a machine control interface 610, comprising a selection dial 404, feature toggles 414, and an integral display 408. The wireless device selection interface system 400f is readily adapted for a wide variety of control applications, such as for home appliances, for business machines, or for industrial applications.

Figure 18:
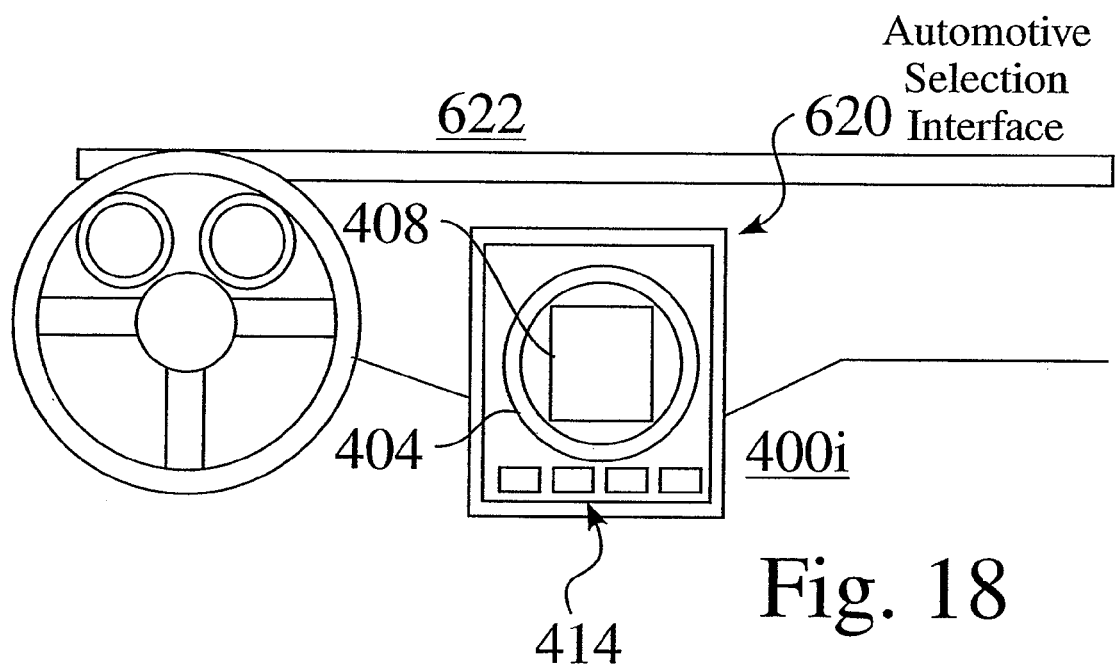
FIG. 18 is a schematic view of a dial and display system implemented in an automobile, such as for navigation selection and display.

FIG. 18 is a schematic view of selection interface system 400i implemented for an automobile 622, such as for navigation selection and display, comprising a selection dial 404, feature toggles 414, and an integral display 408. The automotive selection interface system 400i is readily adapted for a wide variety of automotive chores, such as for music selection, navigation, engine monitoring, security, and/or HVAC control functions.

Sample System Applications. The selection interface system 400i can be used for a wide variety of applications, and is ideally suited for environments in which a user desires to make a selection from a large plurality of items and properties, such as but not limited to parts, components, assemblies, consumer goods, transportation, electronics, or materials. A user may readily select and gain access to an image 410 or other information 412, 422,432,434 related to a generic, i.e. available item/class of items 514 having multiple properties, by which a most nearly matching item is selected from a universe of such items 514.

The selection interface system 400 allows a user to quickly navigate to a selection of one or more items 514, which most closely meet the desired parameters 406, without wasting time with items 514 which do not meet the desired parameters, while avoiding a specification of an item, such as a product, part, material, or commodity, which is not "available" or possible, i.e. not currently manufactured, not in stock, and/or is not a feasible selection.

Furthermore, as described above, the selection interface system 400i readily provides a composite selection interface, such as for profiling, animation, architecture, or modeling, wherein portions of an image 410 are retrieved and displayed, in response to user selections 406.

As well, the selection interface system 400i may readily be enhanced by front-end or back-end systems. For example, an introductory screen on a vehicle merchandising system can determine the class of vehicle to be selected. Similarly, a back-end enhancement in a vehicle selection system may provide a product link, a shopping cart function, or a list of local suppliers.

Figure 19:
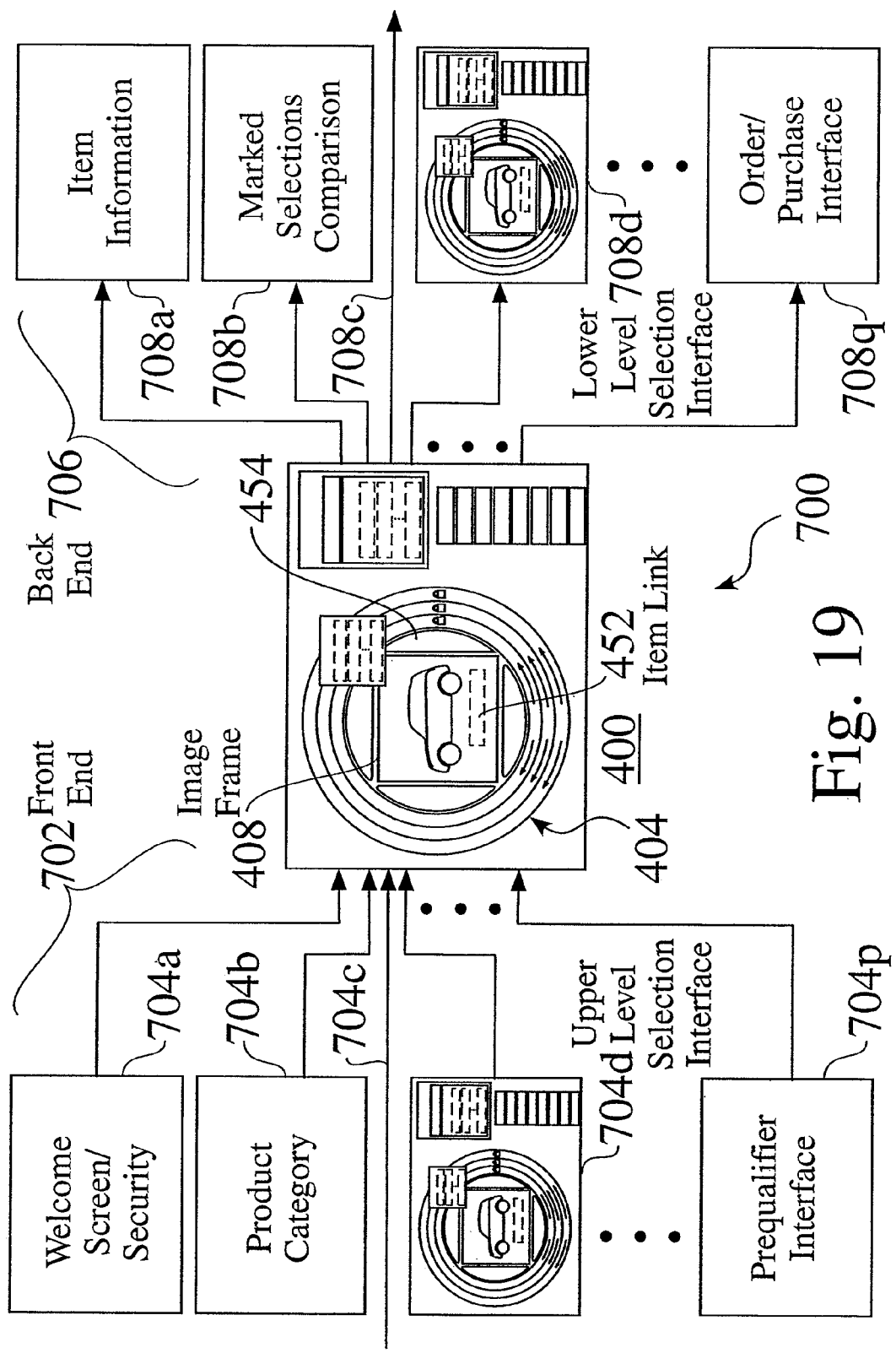
FIG. 19 is a schematic view which shows an exemplary front end and back end to a selective interface system.

FIG. 19 is a schematic view 700 which shows an exemplary front end 702 and back end 706 to a selective interface system 400. As seen in FIG. 19, the selective interface system 400 is readily accessed at a client computer 106, e.g. 106a (FIG. 11), either directly 704c, or through a wide variety of linked pages 704a-704p. For example, the central selective interface system 400 shown in FIG. 19 is accessible through a welcome/security log-in screen 704a, a product category selection screen 704b, a direct link 704c, an upper level selection interface 704d, or a pre-qualification interface 704p.

Similarly, the selective interface system 400 preferably further comprises a selectable back end 706, either directly 708c, to a wide variety of linked pages 708a-708q. For example, the central selective interface system 400 shown in FIG. 19 is provides access to an item information screen 708a, e.g. as linked through a product link icon or button 452 (FIG. 8), a marked selections comparison screen 708b, a direct external link 708c, a lower level selection interface 708d, e.g. to select more features 706, or an order/purchase interface 708q, e.g. as linked through a buy icon or button 454 (FIG. 8).

In a back-end enhancement in a criminal suspect selection system 400, e.g. 400b (FIG. 7), a retrieved image may additionally be rendered to modify features, such as to provide age progression, or to change other facial characteristics, e.g. such as the addition of a beard, moustache, glasses, and/or scar. In a back-end enhancement in a cosmetic or reconstructive surgery selection system 400, a retrieved image may additionally be rendered to modify features, such as to provide age reduction, or to display other modifiable facial characteristics, e.g. such as for nose reshaping, wrinkle removal, and/or scar reduction.

The selection interface system 400i is readily adaptable for other selection systems, such as within a graphic user selection interface for education or entertainment items. For example, with a channel or movie selection interface, a user can easily navigate to desired programming, e.g. within selectable movie dial choices for movie type, movie year, and available stars, a user can readily navigate to search for western movies starring Gary Cooper within a given year.

Product Forms. As described above, information regarding available items 514 is prepared and stored in a database 116, 516, such that the processor 102 (FIG. 3), 530 (FIG. 10) can retrieve and link appropriate selections 514.

Figure 20:
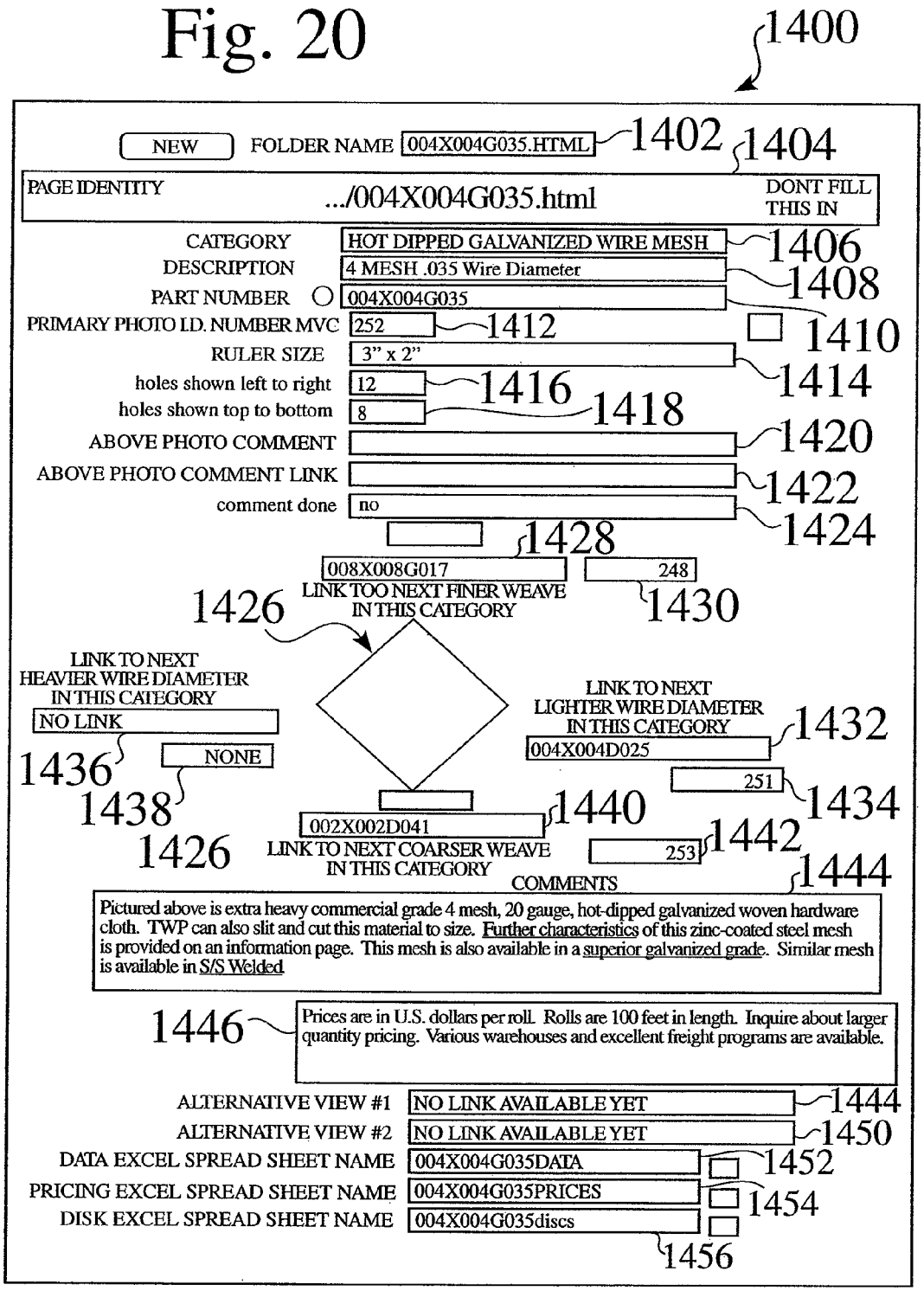
FIG. 20 is a diagram that represents a design form for a first product page.

FIG. 20 diagrams a form 1400 that corresponds to the implementation of position 302 (FIG. 5). A folder name 1402 is filled-in with "004X004G035.HTML", e.g., the hypertext mark-up language (HTML) for 4×4 mesh galvanized 0.035" diameter. An URL 1404 designates where the HTML file will be found on the Internet, e.g., " . . . /004X004G035.html". This is read, using hypertext transfer protocol. Within the World Wide Web, at TWPINC.com, file 004X004G035.html. In actuality, the domain name server (DNS) converts the "TWPINC.com" part to a four-place Internet protocol (IP) address in the form "00.00.00.00". A category box 1406 allows for a common grouping, e.g., "Hot Dipped Galvanized Wire Mesh". A description box 1408 is used to enter the common product name, e.g. "4-Mesh 0.035 Wire Diameter". A part number box 1410 provides information necessary to order this product, e.g., "004X004G035". A photo-ID box 1412 identifies which GIF or JPG picture file relates to this particular product, e.g., "252". Such information is used to control what appears in product picture 224 (FIG. 4). A ruler-size box 1414 is filled in with information that corresponds to the scale used in the picture file recited in the photo-ID box 1412. For example, "3 by 2 inches". A horizontal dimension box 1416 is filled-in with the number of holes, left-to-right, represented in the product picture. A vertical dimension box 1418 is filled-in with the number of holes, top-to-bottom, represented in the product picture. A photo-comment box 1420 provides for comments about the product picture. A photo-comment link box 1422 provides for a file or URL link to information about the product picture. A comments-done? box 1424 allows work-in-progress to be marked.

Figure 1:
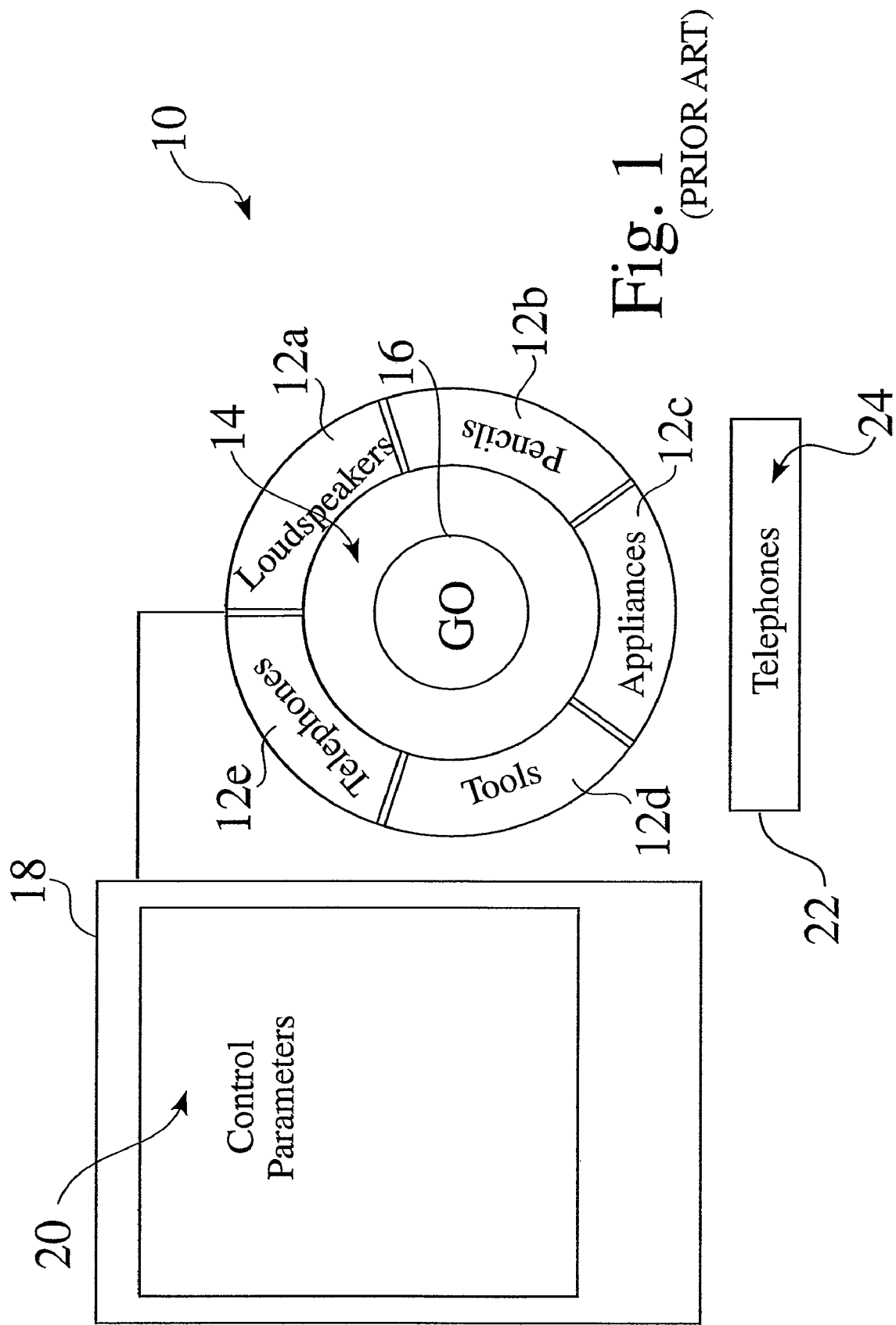
FIG. 1 is a schematic view of a prior art telephone interface.
Figure 2:
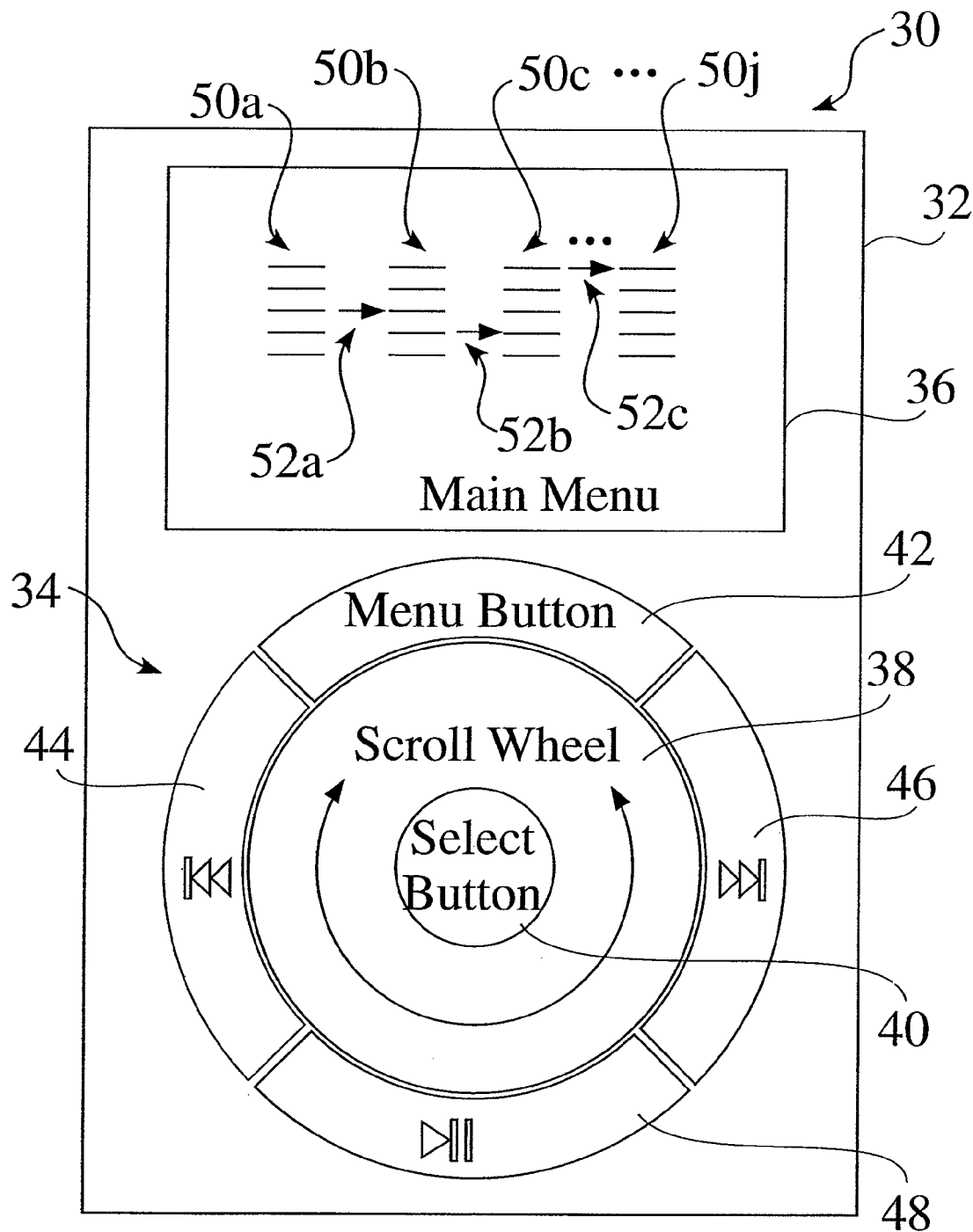
FIG. 2 is a schematic view of a prior art dial menu selection and control interface.

A four-way navigation symbol 1426 signals the four directions a user can navigate, and corresponds to navigation window 202, especially buttons 210-213 (FIG. 4). A next-finer weave box 1428 indicates a product description, file, or URL to be taken, e.g. "008X008G017". A next-link photo box 1430 corresponds to the item in the next-finer weave box 1428. A next-lighter-wire box 1432 indicates a product description, file, or URL to be taken, e.g. "004X004G025". A next-link photo box 1434 corresponds to the item in the next-lighter-wire box 1432. A next-heavier-wire box 1436 indicates a product description, file, or URL to be taken, e.g. "no-link". See, position 314 (FIG. 5). A next-link photo box 1438 corresponds to the item in the next-heavier-wire box 1436. A next-coarser weave box 1440 indicates a product description, file, or URL to be taken, e.g. "002X002D041". A next-link photo box 1442 corresponds to the item in the next-coarser weave box 1440. A comments box 1444 includes remarks that the webpage designer wants to appear in the comments field (FIG. 4). Similarly, a price-table comments box 1446 includes remarks that the webpage designer wants to appear when prices are quoted. An alternate view-1 box 1448 is used for alternative product photos that will be displayed as picture 224 in response to clicking on button 226 (FIG. 2). An alternate view-2 box 1450 is used for alternative product photos that will be displayed as picture 224 in response to clicking on button 228 (FIG. 4). An Excel spreadsheet name box 1454 is used to link to a corresponding prices file, e.g., as would be invoked in response to clicking button 230 (FIG. 4). A disk Excel spreadsheet name box 1456 is included."

Figure 21:
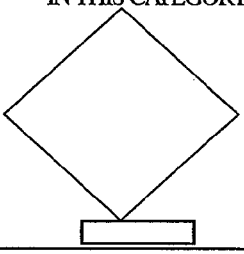
FIG. 21 is a diagram that represents a design form for a second product page

FIG. 21 diagrams a form 1500 that corresponds to the implementation of position 306 (FIG. 5). A folder name 1502 is filled-in with "008X008G017.HTML", e.g. the hypertext mark-up language (HTML) file for 8×8 mesh galvanized 0.017" diameter. An URL 1504 designates where the HTML file will be found on the Internet, e.g. " . . . /008X008G017.html". The rest of the form 1500 is similar to that represented in FIG. 20.

FIG. 22 diagrams a form 1600 that corresponds to the implementation of position 310 (FIG. 5). A folder name 1602 is filled-in with "002X002G041.HTML", e.g. the hypertext mark-up language (HTML) file for 2×2 mesh galvanized 0.041" diameter. An URL 1504 designates where the HTML file will be found on the Internet, e.g. " . . . /002X002G041.html". The rest of the form 1600 is similar to that represented in FIG. 20.

FIG. 23 diagrams a form 1700 that corresponds to the implementation of position 318 (FIG. 5). A folder name 1702 is filled-in with "004X004D025.HTML", e.g. the hypertext mark-up language (HTML) file for 4×4 mesh galvanized 0.025" diameter. An URL 1704 designates where the HTML file will be found on the Internet, e.g. " . . . /004X004G025.html". The rest of the form 700 is similar to that represented in FIG. 20.

System Advantages. The user selection system 400 readily provides a means whereby a user can quickly and efficiently browse, select, compare, and view items, such as within an Internet merchandising system. Rather than random or categorized navigation between a large plurality of products, a user may readily select from within a small variety of items which meet desired selection parameters 406a-406j, within an intuitive dial interface. Images 410 and other information is quickly retrieved and displayed for the user, typically within the same interface 400, such that the user can quickly select an item, product, or other commodity from a large universe of items, products, or other commodities.

Although the invention is preferably described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented selection interface system, comprising:
   a database comprising a stored image of an item and information which corresponds to a plurality of selectable characteristics that each comprise a set of parameters that modify the appearance or features of said item;
   a processor configured to effect the display of a plurality of circular selectors, each of said circular selectors uniquely linked to one of the selectable characteristics of said item and operable to select any of a corresponding one of said set of parameters associated with said one of said characteristics, said circular selectors defining a common central region;
   said processor configured to provide a selection lock associated with at least one of said circular selectors and operable to lock a selected parameter within a selectable characteristic, wherein only items which meet a locked parameter are available for presentation to a user; and
   said processor configured to effect the display of an image window located within the central region linked to the selectors, for display of an image which corresponds to the item as modified by the selected parameters associated with the selected characteristics of said item;
   whereby the image that corresponds to each parameter selected from each a selected characteristic is retrievably displayable on the image window.

2. The selection interface system of claim 1, at least a portion of the information is retrievably displayable on the image window.

3. The selection interface system of claim 1, wherein the image comprises a single image which matches the selected characteristics.

4. The selection interface system of claim 1, wherein the image comprises a composite image which matches the selected characteristics.

5. The selection interface system of claim 1, wherein the circular selectors further comprise a mechanical interface.

6. The selection interface system of claim 1, wherein the circular selectors comprise a graphic user interface.

7. The selection interface system of claim 1, further comprising:
   means for displaying an alternate image which corresponds to the selected characteristics.

8. The selection interface system of claim 1, further comprising:
   means for displaying an movie which corresponds to the selected characteristics.

9. The selection interface system of claim 1, further comprising:
   means for presenting sound information which corresponds to the selected characteristics.

10. The selection interface system of claim 1, wherein the selectable characteristics are associated with any of a product, commodity, item, material, and entity.

\* \* \* \* \*